(12) United States Patent
Miki et al.

(10) Patent No.: US 7,062,082 B2
(45) Date of Patent: Jun. 13, 2006

(54) METHOD AND APPARATUS OF MEASURING THREE-DIMENSIONAL POSTURE OF SPHERE AND METHOD OF MEASURING ROTATIONAL AMOUNT OF SPHERE AND DIRECTION OF ROTATIONAL AXIS THEREOF

(75) Inventors: Mitsunori Miki, 2-8-1, Kizugawadai, Kizu-cho, Souraku-gun, Kyoto (JP); Masaya Tsunoda, Hyogo (JP); Masahide Onuki, Hyogo (JP)

(73) Assignees: Mitsunori Miki, Kyoto (JP); SRI Sports Limited, Kobe (JP)

(*) Notice: Subject to any disclaimer, the term of this patent is extended or adjusted under 35 U.S.C. 154(b) by 689 days.

(21) Appl. No.: 10/122,318

(22) Filed: Apr. 16, 2002

(65) Prior Publication Data

US 2003/0031359 A1 Feb. 13, 2003

(30) Foreign Application Priority Data

May 9, 2001 (JP) .............................. 2001-139025

(51) Int. Cl.
G06K 9/00 (2006.01)

(52) U.S. Cl. ...................................... 382/154; 345/418

(58) Field of Classification Search ................ 382/107, 382/154, 285, 287, 289, 296, 298, 312; 345/427, 345/418; 348/207, 142; 437/141, 147, 150, 437/359, 374; 328/106, 107; 702/94, 104, 702/145; 273/153 S
See application file for complete search history.

(56) References Cited

U.S. PATENT DOCUMENTS

| | | | | |
|---|---|---|---|---|
| 5,446,798 A | * | 8/1995 | Morita et al. ................ 382/154 |
| 5,471,383 A | | 11/1995 | Gobush et al. ................ 200/91 |
| 5,724,447 A | * | 3/1998 | Fukushima .................. 382/211 |
| 5,815,158 A | * | 9/1998 | Lubachevsky et al. ...... 345/427 |
| 5,833,552 A | * | 11/1998 | Hamada et al. .............. 473/359 |
| 6,042,483 A | | 3/2000 | Katayama .................... 473/199 |
| 6,135,898 A | * | 10/2000 | Higuchi et al. .............. 473/374 |
| 6,226,416 B1 | | 5/2001 | Ohshima et al. ............. 382/289 |
| 6,295,069 B1 | * | 9/2001 | Shirur ........................ 345/420 |
| 6,301,372 B1 | * | 10/2001 | Tanaka ....................... 382/106 |
| 6,327,380 B1 | * | 12/2001 | Sciandra et al. ............. 382/154 |
| 6,579,190 B1 | * | 6/2003 | Yamamoto ................... 473/141 |
| 6,795,113 B1 | * | 9/2004 | Jackson et al. .............. 348/143 |

FOREIGN PATENT DOCUMENTS

| | | |
|---|---|---|
| JP | 7-302341 | 11/1995 |
| JP | 10-186474 | 7/1998 |
| JP | 2810320 | 7/1998 |
| JP | 2950450 | 7/1999 |

* cited by examiner

Primary Examiner—Sheela Chawan
(74) Attorney, Agent, or Firm—Birch, Stewart, Kolasch & Birch, LLP

(57) ABSTRACT

A sphere having a plurality of marks given to the surface thereof is photographed at a plurality of times to obtain a plurality of two-dimensional images of said sphere. An imaginary sphere having a plurality of marks given to the surface thereof is generated in a three-dimensional coordinate space by a computer. In making the imaginary sphere placed in a reference posture coincident with the posture of the two-dimensional image, an optimum displacement amount of said posture of said imaginary sphere is determined by using a computation based on Genetic Algorithms. A rotation matrix is derived from the posture of the sphere measured for each dimensional image thereof and a computation is performed on the rotation matrix to thereby obtain the rotational amount of the sphere and the direction of its rotational axis.

15 Claims, 19 Drawing Sheets

FIG. 6A

| | BINARY | DECIMAL |
|---|---|---|
| a | 1 0 1 0 0 | 20 |
| b | 1 1 1 1 1 | 31 |

⇨ CROSSOVER

| BINARY | DECIMAL |
|---|---|
| 1 0 1 1 1 | 23 |
| 1 1 1 0 0 | 28 |

EXAMPLE OF ONE-POINT CROSSOVER

FIG. 6B

| | BINARY | DECIMAL |
|---|---|---|
| a | 1 0 1 0 0 | 20 |
| b | 1 1 1 1 1 | 31 |

⇨ CROSSOVER

| BINARY | DECIMAL |
|---|---|
| 1 0 1 1 0 | 22 |
| 1 1 1 0 1 | 29 |

EXAMPLE OF TWO-POINT CROSSOVER

FIG. 7

DELETION    0 1 1 0 0 0 1 → 0 1 1 0 1

EXCHANGE    0 1 1 0 0 0 1 → 0 1 1 1 1 0 0 1

INSERTION   0 1 1 0 0 0ᵛ1 → 0 1 1 0 0 0 0 1

REVERSE     0 1 1 0 0 0 1 → 0 1 0 0 1 0 1

KIND OF MUTATION

[Prior Art]

[Prior Art]

[Prior Art]

[Prior Art]

METHOD AND APPARATUS OF MEASURING THREE-DIMENSIONAL POSTURE OF SPHERE AND METHOD OF MEASURING ROTATIONAL AMOUNT OF SPHERE AND DIRECTION OF ROTATIONAL AXIS THEREOF

BACKGROUND OF THE INVENTION

1. Field of the Invention

The present invention relates to a method of measuring a three-dimensional posture of a sphere, a method of measuring a rotational amount and a direction of the rotational axis of the sphere, and an apparatus of measuring the three-dimensional posture of the sphere. More particularly the present invention relates to a method of measuring the posture of the sphere such as a golf ball, a baseball ball, a tennis ball, and the like and its rotational amount.

2. Description of the Related Art

Various methods and apparatuses of measuring the rotational amount and the like of the sphere such as a golf ball are known.

According to a known method, light is emitted to a sphere having a reflection tape bonded to its surface or to a sphere having a region, painted in black on its surface, not reflecting light therefrom. The rotational amount of the sphere is measured from change in the amount of reflection light obtained by the rotation of the sphere. However according to this method, because only the optical amount is measured but the contour of the sphere and the displacement of its posture are not measured, it is impossible to specify the direction of the sphere. Thus normally, the rotational amount of the sphere and the direction of its rotational axis are found from a displacement situation of marks of each of a plurality of images of a sphere photographed at predetermined intervals when the sphere is flying in rotation.

As apparatuses and methods of finding the rotational amount of the sphere from images of a photographed mark-given sphere, the following measuring apparatuses and methods are known: The apparatus for measuring the rotational amount of the sphere disclosed in U.S. Pat. No. 2,810,320, the method of measuring the motion of a golf ball disclosed in Japanese Patent Application Laid-Open No. 10-186474, and the apparatus for measuring the flight characteristic of sporting goods disclosed in U.S. Pat. No. 2,950,450.

In the measuring apparatus disclosed in U.S. Pat. No. 2,810,320, as shown in FIGS. 16A and 16B, the sphere T, having the center C, to which the marks P and Q are given is photographed twice to obtain two two-dimensional images G1 and G2, and the radius of the sphere in each of the two-dimensional images G1 and G2 is specified as the unit radius. Further the three-dimensional coordinate of each of the marks P and Q and the center C is computed from the two-dimensional coordinate on the two-dimensional image G1. The three-dimensional coordinate of each of the marks P' and Q' and the center C' is also computed from the two-dimensional coordinate on the two-dimensional image G2. These computed three-dimensional coordinates are set as three-dimensional vectors to find the vector movement amount between the two images G1 and G2 to thereby compute the rotational amount of the sphere T and the direction of its rotational axis.

With reference to FIGS. 17A and 17B, in the measuring method disclosed in Japanese Patent Application Laid-Open No. 10-186474, the ball image G3 having the two balls B1 and B1' photographed thereon is obtained by photographing the ball B1 with the first and second cameras 1A and 1B at an interval determined by the sensor 2 which detects the motion of a club when it hits the ball B1. The two-dimensional ball image G3 is processed by the method similar to that of the measuring apparatus disclosed in U.S. Pat. No. 2,810,320 to compute the rotational amount and the direction of its rotational axis.

With reference to FIGS. 18A and 18B, in the measuring apparatus 4 disclosed in U.S. Pat. No. 2,950,450, the balls B2 and B2' to which the mark Ba has been given are photographed with the synchronized cameras 5A and 5B to obtain the images of the balls B2 and B2'. Based on the obtained images, the three-dimensional coordinate of the mark Ba is obtained based on the principle similar to the triangulation by relating the principle to the relationship between the visual field of the camera 5A and that of the camera 5B. Based on the obtained three-dimensional coordinate of the mark Ba, as shown in FIG. 18B, a view of the three-dimensional region of the balls B2 and B2' is obtained to measure the characteristics of the balls B2 and B2'. The method of obtaining the three-dimensional coordinate in this manner is known as DLT (Direct Liner Transformation).

In addition to the above-described apparatuses and method, the apparatus 6 for detecting the posture of a three-dimensional object is disclosed in Japanese Patent Application Laid-Open No. 7-302341, as shown in FIG. 19. The posture detection apparatus 6 measures not the posture of a sphere, but the posture of the three-dimensional object by using a Genetic Algorithms. That is, a fitness value is found by comparing a plurality of images of the three-dimensional object 8 photographed with a plurality of cameras 7a–7n with a plurality of imaginary images of the imaginary three-dimensional object 9 formed in correspondence to the three-dimensional object 8. Based on the Genetic Algorithms conforming to the fitness value, the posture of the three-dimensional object 8 is detected by changing the posture of the imaginary three-dimensional object 9.

In the measuring apparatus shown in FIGS. 16A and 16B and the measuring method shown in FIGS. 17A and 17B, because the radius of the ball image is used in the computation for measurement, the accuracy of the three-dimensional vector which is computed depends on the accuracy of the radii of the sphere obtained from the images. Thus it is necessary to highly accurately photograph the ball images and find the radius of the sphere with high accuracy from the photographed images. To obtain a still image of the ball flying at a high speed, it is necessary to use a high-speed camera having a high-speed shutter. However because the high-speed shutter opens in a very short period of time, it is difficult to obtain a sufficient amount of light.

Therefore the photographed ball image is comparatively clear in the vicinity of the center of the ball, because the center of the ball confronts the camera. On the other hand, it is difficult to capture the contour of the ball clearly. Even though the manner of emitting the ball is adjusted, it is difficult to solve this problem. Consequently the contour of the photographed image of the ball is unclear. Thus the radius of the ball is read with low accuracy from the ball image, which causes the rotational amount of the ball and the direction of its rotational axis to be measured with low accuracy.

In the measuring apparatus shown in FIGS. 18A and 18B, the three-dimensional coordinate of the mark given to the surface of the ball is obtained not by using the radius of the ball image but on the basis of the length of an actual space. Thus it is unnecessary to photograph the contour of the ball clearly and the problem of shortage of luminous intensity rarely occurs, therefore a camera is required a low extent. However to find the three-dimensional coordinate of the mark given to the surface of the ball with high accuracy, it is necessary to photograph the ball in a comparatively large size to allow each mark to be read accurately. To photograph the ball in a large size, it is necessary to shorten the interval between two ball image-photographing times, which reduces the rotational amount of one ball image with respect to that of the other ball image.

To measure the rotational amount of the ball with high accuracy, it is necessary to increase the moving distance of the mark to thereby increase the displacement of the position of the mark, i.e., increase the amount of rotation of one ball image with respect to that of the other ball image, which necessitates a condition reciprocal to the increase of the ball image.

Thus it is possible to measure the three-dimensional coordinate of the mark with high accuracy by increasing the ball image. However, because the change of the positions between both images is small, the rotational amount of the ball cannot be measured with high accuracy. In the case where the ball is photographed in such a way as to increase the rotational amount of one ball image with respect to that of the other ball image, it is necessary to photograph the ball at a long interval. In this case, although the rotational amount of the ball can be measured with high accuracy, the ball images are small. Therefore the three-dimensional coordinate of the mark is measured with low accuracy. Thus the measuring apparatus is incapable of measuring both the three-dimensional coordinate of the mark and the rotational amount of the ball with high accuracy.

To solve the above-described problem, it is conceivable to prepare two sets of measuring apparatuses, obtain the image of one ball with a first measuring apparatus and the image of the other ball with a second measuring apparatus to measure both the three-dimensional coordinate of each mark and the rotational amount of each ball with high accuracy. However in measuring the three-dimensional coordinate of the mark and the rotational amount of the ball, it is necessary to make a calibration by associating the operation of four cameras of both sets of the measuring apparatuses with each other. Furthermore the measuring apparatus is required to have a very complicated construction and is hence expensive. As such, it is difficult to use two sets of the measuring apparatuses.

Further in computing the rotational amount of the ball from the movement amount of the photographed mark given to the surface of the ball, it is necessary to recognize the mark on the second ball image corresponding to the mark on the first ball image. However in the case where the direction of the rotational axis of the ball can be estimated and the change of the rotational amount of one ball image with respect to that of the other ball image is small, it is comparatively easy to recognize the mark on the second ball image corresponding to the mark on the first ball image. However in the case where the direction of the rotational axis of the ball cannot be estimated because the direction of the rotational axis of the ball changes greatly in each measurement or in the case where the rotational amount of the ball is large, it is very difficult to recognize the mark on the second ball image corresponding to the mark on the first ball image. In this case, there is a possibility that it is impossible to measure the rotational amount of the ball and the like by an automatic recognition program of a computer. In the case where a man recognizes the mark on the second ball image corresponding to the mark on the first ball image, it takes much time and may make an erroneous recognition of the mark.

In addition, it is impossible to make measurement in the case where the mark photographed on the first ball image moves to the reverse side of the ball owing to its rotation and does not appear on the surface of the ball image. In his case, there is a limitation in the measuring direction of the camera and the rotational direction of the ball. Thus the measuring apparatus has a problem that measurement cannot be accomplished in an optimum situation.

In the posture detection apparatus 6 shown in FIG. 19, since a plurality of cameras 7a–7n are used, the measuring cost is high. The ball is symmetrical with respect to the axis passing through its center. Thus when the posture of the ball, namely, the direction thereof changes, there is no change among the photographed images of the ball. That is, when the ball images and the imaginary images are compared with each other, the posture of the ball cannot be specified. Further in the posture detection apparatus 6, the fitness value is determined on the basis of an overlapping degree of a plurality of images. Thus it is necessary to photograph the ball image clearly. However in the case where the posture of the sphere such as the golf ball which moves at a high speed is measured, it is difficult for the cameras 7a–7n to follow and photograph the sphere moving at a high speed. It is almost impossible to take a photograph of the ball in such a way that all the images of the ball are clear. Because the fitness value is determined on the basis of the images containing a considerable degree of errors respectively, the posture detection apparatus 6 is incapable of measuring the posture of the ball with high accuracy.

SUMMARY OF THE INVENTION

The present invention has been made in view of the above-described problems. Thus it is an object of the present invention to specify the posture of a sphere without using data of the contour of the image of a sphere thereof and automatically measure the rotational amount of the sphere and the like with high accuracy by using a computer from a specified posture of the sphere.

To achieve the object, there is provided a method of measuring a three-dimensional posture of a sphere, including the steps of photographing a sphere having a plurality of marks given to a surface thereof to obtain a two-dimensional image of the sphere; preparing an imaginary sphere having a plurality of marks given to a surface thereof in a three-dimensional coordinate space by operating a computer; setting an arbitrary posture of the imaginary sphere as a reference posture and setting an arbitrary imaginary sphere-measuring direction as a viewing direction; operating the computer to displace the posture of the imaginary sphere in such a way that the marks given to the imaginary sphere are coincident with the marks on the surface of the two-dimensional image of the sphere; and specifying a three-dimensional posture of the sphere on the basis of a displacement amount of the posture of the imaginary sphere relative to the reference posture.

As described above, according to the present invention, in computing the rotational amount and the like of the sphere, the three-dimensional posture of the sphere in the imaginary three-dimensional space is specified, based on the two-dimensional image of the photographed sphere. Because the sphere is symmetrical with respect to its axis, and a plurality of marks are given on the surface of the sphere, the external symmetric property of the sphere is eliminated, and directionality of the sphere is generated. Thus it is possible to place both the position of the sphere in the three-dimensional coordinate space and the posture of the sphere, namely, the orientation thereof. As above-mentioned by giving a plurality of marks to the surface of the sphere whose posture is measured, forming the imaginary sphere to which a plurality of marks have been given in an imaginary three-dimensional coordinate space formed on the display screen of the computer, and relating the posture of the imaginary sphere and the posture of the actual sphere to each other, the posture of the actual sphere can be measured from the posture of the imaginary sphere.

More specifically, the posture of the imaginary sphere, which is placed in the reference position, the initial state, is displaced so as to be coincident with the posture of the two-dimensional image of the photographed sphere. The posture of the sphere can be specified from the amount of the displacement of the posture of the imaginary sphere with respect to the reference posture, namely, a coordinate value relative to the reference posture. The imaginary sphere is viewed in an arbitrarily set direction. The posture of the imaginary sphere before and after the posture thereof is displaced is measured from a set visual point. Since the imaginary sphere is viewed in one direction, one image of the sphere corresponding to the imaginary sphere suffices in specifying the posture of the imaginary sphere, and time and labor in photographing the actual sphere can be reduced.

It is possible to express the position and posture of the actual sphere in terms of the coordinate value relative to the reference posture in the imaginary three-dimensional space by relating the posture of the imaginary sphere and that of the actual sphere to each other. Consequently it is possible to use the coordinate value relative to the reference posture in the imaginary three-dimensional space to analyze the rotational amount of the sphere and the direction of its rotational axis and automatically perform a computation in analyzing the characteristic of the rotation and the like of the sphere by the computer.

In the present invention, to measure the posture of the sphere on the basis of a plurality of marks on the surface of the two-dimensional image of the sphere, contour data of the sphere is not used in the measurement. It is possible to measure the posture so long as the mark given to the sphere can be clearly recognized on the two-dimensional image, even though the contour of the sphere is unclear. Further by measuring the posture of the sphere from one image, it is easy to photograph the dimension of the sphere in a magnified dimension. In the case where the image of the sphere is large, it is possible to reduce the degree of error in reading the mark on the surface of the sphere and relate the posture of the imaginary sphere and that of the sphere to each other with high accuracy. To allow the computer to automatically recognize the mark of the sphere from the two-dimensional image of the photographed sphere, it is conceivable to execute binarization of displaying the image in only white and black.

To photograph the two-dimensional image of the actual sphere, it is necessary to use means such as a still camera, a CCD camera or the like for photographing the image and means such as a film, an image memory or the like for recording the image. In addition, micro-flashes are used to photograph an instantaneous still state of the sphere image by utilizing the difference between luminance of one micro-flashes and that of the other micro-flash when they emit light in a short period of time. One or a plurality of means for photographing the two-dimensional sphere image can be used. It is possible to specify the posture of the sphere from one sphere image. In the case where the sphere moves at a speed as high as 10 m/s or more, it is possible to obtain a still image without a blur occurring, by using a high-speed shutter or a micro-flash.

The following means are used to obtain the position of the mark given to the sphere on the basis of the image thereof: In the case where a film is used as the recording means, the following methods are known: A simple method of measuring the position of the mark by applying a scale to a developed photograph and a method of measuring the position of the mark with a measuring cursor on a display screen of a computer by using an image input device such as a scanner capable of capturing the image of a film or a photograph into the computer. In the case where the image memory is used as the recording means, the following methods are known: A method of measuring the position of the mark with a measuring cursor by reading data stored in the image memory on the display screen of the computer. That is, so long as the two-dimensional position of each mark on the image of the sphere is obtained, the measuring method is not limited to a specific one.

The posture displacement operation is to magnify and minify, move, and rotate the imaginary sphere. The displacement amount of the posture of the imaginary sphere relative to the reference posture is specified by a computation based on a Genetic Algorithms as the amount of the operation of magnifying and minifying, moving, and rotating the imaginary sphere. Because the reference posture of the imaginary sphere formed on the computer is set arbitrarily, there is a difference between the size, position, and posture of the imaginary sphere and those of the two-dimensional image of the photographed sphere. Since the posture of the sphere can be displayed by the coordinate value relative to the reference position of the imaginary sphere in the imaginary space, it is necessary to perform the operation of displacing the posture of the imaginary sphere in such a way that the posture of the imaginary sphere is coincident with that of the two-dimensional image of the sphere.

As described above, the posture of the imaginary sphere is displaced by the operation of magnifying and minifying, moving, and rotating on the computer. It is possible to make the posture of the imaginary sphere coincident with that of the actual sphere correctly by appropriately determining the amount of the displacement of the imaginary sphere such as the magnification and minification thereof. Consequently the posture of the sphere can be specified with high accuracy by the coordinate relative to the reference posture. In the present invention, the determination of the amount of the displacement of the imaginary sphere is considered as the problem of optimization. Computations are performed by using the Genetic Algorithms, for a computer, which is one of methods for solving the problem of optimization.

The Genetic Algorithms applies the process in which an living things having an individual genetic information in the form of a chromosome is altered by a reproduction, a selection, and a mutation and succeeded to the next generation to a method of solving the problem of an artificial optimization. More specifically, in the computation performed based on the Genetic Algorithms, variables of a large number of individuals forming the group of solutions are converged into an optimum solution by selecting an individual which can leave a descendant to the next generation, based on a fitness value by which a determination is made and by repeating, for a large number of generations, a reproduction process of a crossover of rearranging elements of arbitrary variables and the mutation of forcibly altering the elements of the arbitrary variables.

The method of solving the optimization problems by using the Genetic Algorithms has a characteristic different from an optimization method such as simulated annealing method, a gradient method, and the like. For example, in the method of solving the optimization problems by using the Genetic Algorithms, a variable to be computed is coded to a binary number, a character string or a vector, and the fitness value for evaluating a computed result is set on the basis of an objective function. Thus in the Genetic Algorithms, the above-described crossover and mutation can be easily realized by coding the variable. Further by selecting an individual conforming to the fitness value, it is possible to increase the probability of omitting an individual evaluated at a low degree, leave only a superior individual, and an optimum solution is obtained by the computation.

As described above, the Genetic Algorithms is a probabilistic solving method of simultaneously searching an optimum solution from a large number of individuals by the computation. The Genetic Algorithms is capable of deriving an approximate optimum solution and/or a plurality of candidates of solutions similar to the optimum solution for a problem of diversification such as the optimization problems of combination. Because the optimization problems of making the imaginary sphere on the display screen of the computer coincident with the two-dimensional sphere image with reference to a plurality of the marks on the sphere is a problem of diversification, it is particularly useful to introduce the Genetic Algorithms in solving the problem.

In the computation based on the Genetic Algorithms, the magnifying and minifying amount is set as one variable relating to the operation of magnifying and minifying the imaginary sphere, the moving amount is set as two independent variables relating to the operation of moving the imaginary sphere two-dimensionally, and the rotating amount is set as three independent variables relating to the operation of rotating the imaginary sphere three-dimensionally. Each of the operations is performed on the basis of each of the six variables. The six variables thus set correspond to the coordinate value relative to the reference posture. Therefore the posture of the sphere can be specified by finding the numerical value of each of the six variables.

A scale is given as one variable relating to the magnifying and minifying operation. A displacement of each of rectangular coordinates in a plane vertical to an imaginary sphere-viewing direction is given as the two independent variables relating to the operation of moving the imaginary sphere two-dimensionally. A rotation angle of the imaginary sphere around each of the abscissa, the ordinate, and the vertical axis which are the rectangular coordinates of the imaginary three-dimensional coordinate space is given as the three independent variables relating to the operation of rotating the imaginary sphere three-dimensionally.

Not less than two kinds nor more than 1000 kinds of individuals each consisting of a group of the six variables are formed. The individuals are computed, based on the Genetic Algorithms. In the present invention, by setting the group of the six variables as one individual, the solution based on the Genetic Algorithms can be smoothly applied to measurement of the three-dimensional posture of the sphere. The reason the number of individuals is set to the above-described range is because if the number of individuals is less than two kinds, a crossover based on the Genetic Algorithms cannot be made and the Genetic Algorithms itself does not establish. The reason the number of individuals is set to less than 1000 kinds is because if the number of individuals is too many, it takes very long to perform the computation. Thus in consideration of the balance between computation accuracy and computation efficiency, the number of individuals is preferably in the range of 10 to 100 kinds.

In a computation based on the Genetic Algorithms, the numerical value of each of the six variables is converted from a decimal number into not less a 5-bit binary number nor more than a 20-bit binary number by setting one digit of the binary number to one bit. In the present invention, in measuring the three-dimensional posture of the sphere, the coding of the variables is executed by converting the decimal number into the binary number. Since one digit of the binary number takes only 0 or 1, the process of executing the crossover and the mutation can be easily accomplished. The reason the number of bits is limited to the above-described range is because if the number of digits is less than five bits, the decimal number has a few significant figure before it is converted into the binary number, and thus the three-dimensional posture of the sphere is measured with a low degree of accuracy. On the other hand, if the number of digits is more than 20 bits, a computer has a high load in its computing processing. Thus it takes long for the computer to perform the computation. In consideration of the balance between computation accuracy and the load to be applied to the computer in its computation processing, the number of digits is preferably 8–12 bits. In the case where the number of bits of each variable is set to the above-described range, the number of bits (length of chromosome) of the individual is in the range of 30 bits to 120 bits.

The computation based on the Genetic Algorithms includes the steps of, for each of the individuals, performing a first-time posture displacement operation corresponding to a first generation, based on a given numerical value of the six variables of each of the individuals; computing a fitness value from a function on a distance between each mark on a surface of the posture-displaced imaginary sphere and each mark on a surface of the two-dimensional image of the sphere for a posture displacement operation which is performed for each of the individuals; performing a reproduction by setting a probability of individuals which can leave descendants to the next generation, according to a numerical value of the fitness value and by selecting individuals which can leave descendants to the next generation according to the probability; repeating the posture displacement operation, computation of the fitness value, and the reproduction; repeating the posture displacement operation for each of the individuals, the computation of the fitness value, and the reproduction; terminating the computation when a maximum value of the found fitness value does not change in a range of not less than 100th generation nor more than 10000th generation; and specifying an amount of the posture displacement operation at the time when the computation has terminated as a three-dimensional posture of the sphere.

As described above, the fitness value is found by using the function relating to the distance between the mark on the surface of the imaginary sphere whose posture has been displaced and the mark, on the surface of the two-dimensional sphere image, corresponding to the mark of the imaginary sphere, the existence probability of the next generation is set according to the fitness value, and a descendant which is succeeded to the next generation is selected according to the existence probability. That is, the larger the numerical value of the fitness value is, the better it is. Thus the fitness value is set on the basis of the reciprocal number of the objective function which is the sum of the squares of distance between the mark on the surface of the imaginary sphere and the mark on the surface of the two-dimensional sphere image. In this case, individuals each having an error-minimized solution will hold a majority of a set of an object to be computed. Thus it is possible to find a solution which is supposed to minimize the objective function. As the method of making the fitness value and the existence probability thus found proportional to each other, the region of each individual is set on a roulette in correspondence to the fitness value, and a certain number of random numbers regarded as an arrow are generated. In this manner, a roulette selection of leaving an individual hit by the arrow to the next generation can be used.

The individual which can leave a descendant to the next generation is selected by the roulette selection. Then computations are appropriately performed on the next generation including the individual generated by the reproduction such as the crossover and the mutation. Then by using the computations thus performed, the individual which can leave descendants to the subsequent generations is selected according to the computed result on the fitness value. Thereafter, these processes are repeatedly executed. If a maximum value of the fitness value obtained by the computation in the repeated execution of these processes does not change in the range from 100th generation to 10000th generation, it is considered that the variables of individuals have converged into an optimum solution. Thus the computation is terminated. It can be determined that the displacement of the posture of the imaginary sphere at this point is highest in accuracy and coincident with the posture of the two-dimensional sphere image. Thus the displacement of the posture of the imaginary sphere at this point can be specified as the coordinate value relative to the reference position. The above-described computation can be performed automatically by the computer having the program of executing the above-described computation processing.

The reason it is determined that the variables of individuals have converged into an optimum solution in computations of the 100th generation to the 10000th generation is as follows: If it is determined that the variables of individuals have converged into an optimum solution in computations for less than the 100th generation, it is considered that a solution may diverge again. That is, it is too early to determine in computations for less than the 100th generation that the variables of individuals have converged into the optimum solution. The reason it is determined that the variables of individuals have converged into the optimum solution in computations of less than the 10000th generation is because if the variables of individuals have converged into the optimum solution in computations for 10000 generations, it is considered that the solution will hardly diverge again even though computations are performed for generations higher than the 10000th generation and it takes long to perform computations. Thus considering the balance between computation accuracy and the time period required for the computations, it is most favorable to perform computations for the 100th generation to the 1000th generation.

The marks are given to the surface of the sphere in such a way that all of the marks are coincident with each other, when the sphere is viewed in a certain direction, before and after the sphere is rotated on an axis passing through the center thereof at an angle obtained by dividing 360 degrees by a natural number of five or less. In the case where a plurality of marks are given to the surface of the sphere in this manner, all viewable marks are not coincident with each other before and after the rotation of the sphere, when the sphere is rotated at an angle less than 72 degrees. Thus the number of the postures the sphere can take is limited to a small number. According to the present invention, that all marks are coincident with each other before and after the rotation of the sphere at a certain angle when the sphere is viewed in a certain direction is called symmetry.

The angles obtained by dividing 360 degrees by the natural number of five or less are 360 degrees, 180 degrees, 120 degrees, 90 degrees, and 72 degrees. That is, the symmetry at the rotation of 360 degrees means the case in which the marks are given at random to the entire surface of the sphere. In this case, the symmetry occurs only once and the posture of the sphere can be specified primarily. Thus the computation can be accomplished with high accuracy. In the case where the sphere is rotated at 180 degrees, there are two positions of symmetry per rotation. Thus when the posture of the sphere is specified, two postures are present and thus the posture cannot be specified primarily. However the same pattern can be repeated and the mark can be given to the surface of the sphere efficiently. In the case where the sphere is rotated at 120 degrees, there are three positions of symmetry per rotation. In the case where the sphere is rotated at 90 degrees, there are four positions of symmetry per rotation. In the case where the sphere is rotated at 72 degrees, there are five positions of symmetry per rotation. As such, the burden of giving the mark to the surface of the sphere is decreased stepwise.

In the case where the rotational amount or the like of the sphere such as a golf ball and a tennis ball is measured, the rotational direction of the sphere and an approximate rotational amount thereof in a predetermined period of time can be estimated in many cases. In the case of the above-described symmetrical property, there are no particular obstacles to measurement, even though the posture of the sphere cannot be specified primarily.

Even though the marks are given collectively to a portion of the surface of the sphere in the above-described manner, there may be a case where the posture of the sphere cannot be specified because the marks are located at the rear side of the sphere in a sphere-viewing direction. Therefore not less than 10 marks nor more than 100 marks are given to the entire surface of the sphere. The reason the number of the marks is not less than 10 is because if the number thereof is less than 10, a small number of marks can be read in the sphere-viewing direction. In this case, there is a possibility that the posture of the sphere cannot be specified. On the other hand, if the number of the marks is more than 100, it takes long to perform computations, and thus computation efficiency is unfavorable.

The present invention provides a method of measuring a rotational amount of a sphere and a direction of a rotational axis of the sphere, including the steps of specifying a three-dimensional posture of the sphere for each of a plurality of two-dimensional images of the sphere obtained by taking a plurality of photographs of the rotating sphere having a plurality of marks given to a surface thereof at predetermined intervals, by using the method of measuring a three-dimensional posture of a sphere; and measuring the rotational amount of the sphere and the direction of the rotational axis thereof by specifying a matrix relating to a rotation operation of making the three-dimensional posture of the sphere in an earlier time zone coincident with the three-dimensional posture of the sphere in a later time zone present in the predetermined intervals.

For each of a plurality of the two-dimensional images obtained in this manner, the posture of the sphere is specified by an imaginary three-dimensional space coordinate on the display screen of the computer by using the method of measuring the three-dimensional posture of the sphere, and the rotational amount of the sphere can be easily found from the rotation matrix, of the sphere images, which can specify time. That is, each of the two-dimensional sphere images has a coordinate value relative to a common reference position in the imaginary three-dimensional space. The rotational amount and the like of the sphere can be computed by reading the relationship between the postures of the sphere from the coordinate values relative to the common reference position.

More specifically, the rotational amount of the sphere is computed by the product of the rotation matrix of the sphere when the sphere is in an earlier time zone before the predetermined time interval and a reverse matrix of the rotation matrix of the sphere when the sphere is in a later time zone. It is possible to easily find the rotational amount of the sphere and the vector of its rotational axis, namely, the direction of its rotational axis by determining the numerical value of the rotation matrix of the sphere when it is in the time zone after the predetermined interval from the obtained posture of the sphere when it is in the time zone before the predetermined interval.

Further, the present invention provides an apparatus of measuring a three-dimensional posture of a sphere including a photographing means capable of photographing the sphere in various directions; a recording means for recording a two-dimensional image of the sphere obtained by the photographing means; and a computing means for generating an imaginary sphere similar to the sphere in a three-dimensional coordinate space; and computing a posture of the sphere, a rotational amount thereof, and a direction of a rotational axis thereof, based on the imaginary sphere and the two-dimensional image of the sphere.

The computing means has a posture recognition program for displacing a posture of the imaginary sphere in such a way that a certain mark on a surface of the two-dimensional image of the sphere is coincident with a certain mark on the surface of the imaginary sphere and specifying a three-dimensional posture of the sphere on the basis of a displacement amount of the posture of the imaginary sphere relative to a reference posture of the imaginary sphere.

The apparatus of measuring the three-dimensional posture of the sphere is most suitable for executing the method of measuring the three-dimensional posture of the sphere and the method of measuring the rotational amount of the sphere and the direction of the rotational axis thereof. The measuring apparatus is capable of measuring the posture of the sphere, the rotational amount thereof, and the direction of the rotational axis thereof with high precision.

It is preferable that the computing means has a computing program computing a displacement amount of the posture of the imaginary sphere based on the Genetic Algorithms.

Because the computing means has the computing program performing the above-described Genetic Algorithms, the computing means allows the computation to be performed easily by the measuring method which uses the Genetic Algorithms.

It is preferable that the photographing means is constructed in such a way that the photographing means is capable of photographing the rotating sphere at a plurality of times at predetermined intervals.

To obtain a plurality of ball images, it is necessary to capture the ball image at least twice. To do so, one camera is used and light is emitted by a micro-flash to obtain an image of plurality of spheres or a plurality of sphere images. It is possible to use a plurality of cameras to photograph a two-dimensional image respectively at predetermined intervals. In this case, it is necessary to specify a coordinate common to each image by calibration or the like. This is to prevent generation of an image of the sphere which looks as if it were rotating, because the positions of the cameras are different. To allow the sphere moving at a speed 10 m/s or higher, it is preferable to provide the camera with a high-speed shutter or use a micro-flash and the camera in combination.

BRIEF DESCRIPTION OF THE DRAWINGS

FIGS. 6A and 6B explain a crossover.

FIG. 7 shows the kind of a mutation.

DETAILED DESCRIPTION OF THE PREFERRED EMBODIMENTS

The embodiments of the present invention will be described below with reference to drawings.

Figure 1A:
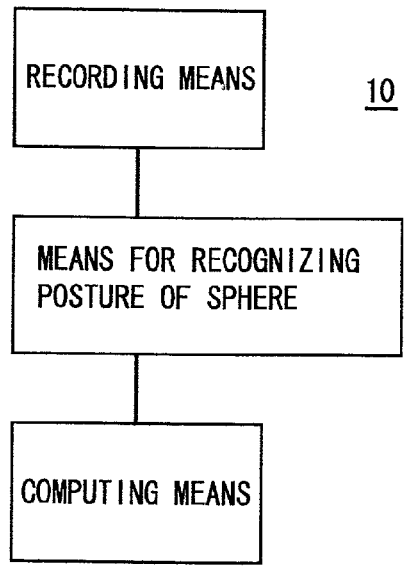
FIG. 1A shows the construction of a measuring apparatus for carrying out the measuring method of the present invention.

FIG. 1A shows the construction of an apparatus 10 for carrying out the method of the present invention, thus measuring a three-dimensional posture of a sphere. The following means are connected to each other to allow transmission and reception of data among them. A photographing means, a recording means, and a sphere posture recognition means having a posture recognition program, and a computing means for computing the posture of the sphere, its rotational amount, and the direction of its rotational axis.

Figure 1B:
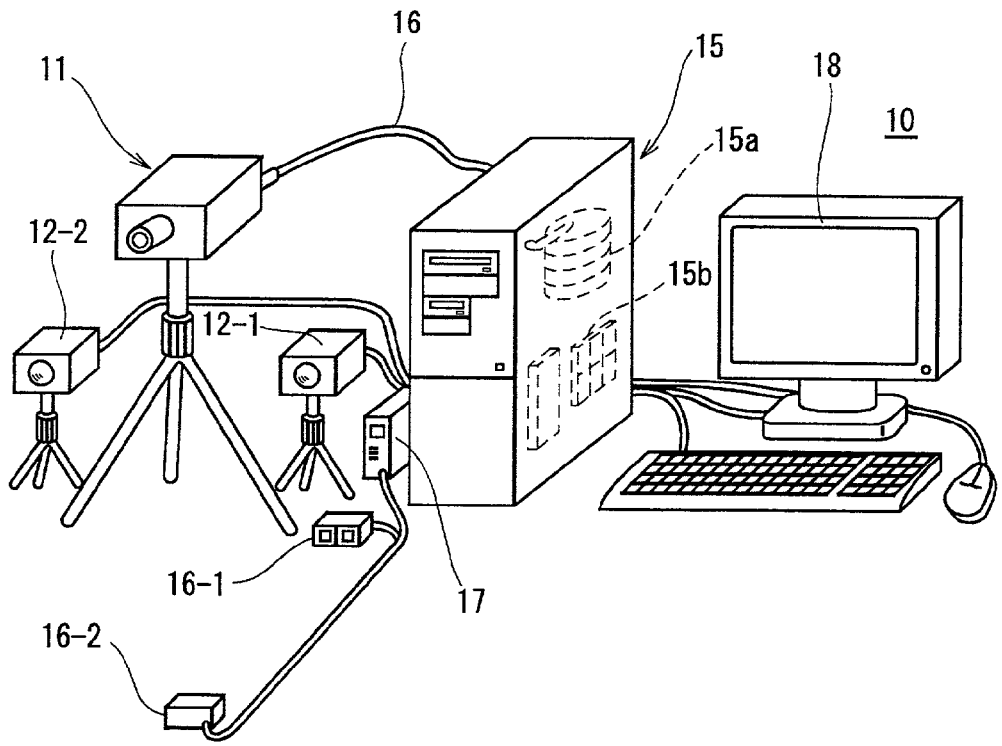
FIG. 1B is a schematic perspective view showing the measuring apparatus.

As shown in FIG. 1B, a measuring apparatus 10 includes a CCD camera 11 serving as the photographing means and the recording means and two micro-flashes 12-1, 12-2. A sphere to be measured is photographed by the CCD camera 11 at a timing when the sphere passes the CCD camera 11. An image memory 15b of the computer 15 stores data of images obtained sequentially. After the micro-flashes 12-1, 12-2 flash sequentially at a predetermined interval, the storage of the image data in the image memory 15b terminates to thereby obtain a two-dimensional image of two spheres on the image memory 15b. That is, a still image of the sphere is obtained by utilizing the difference between the luminance of the micro-flash 12-1 and that of the micro-flash 12-2, when they emit light for a short period of time. To allow the micro-flashes 12-1 and 12-2 to flash at a predetermined timing, a trigger signal generated by photoelectric tubes 16-1, 16-2 and a retarder 17.

The computer 15 of the measuring apparatus 10 has a central processing unit (CPU), a memory, and a hard disk 15a serving as a storage device in addition to the image memory 15b. The hard disk 15a has a program necessary for a posture recognition and a computation. The program is used as the computation means shown in FIG. 1A and the sphere posture recognition means also shown in FIG. 1A.

Figure 2:
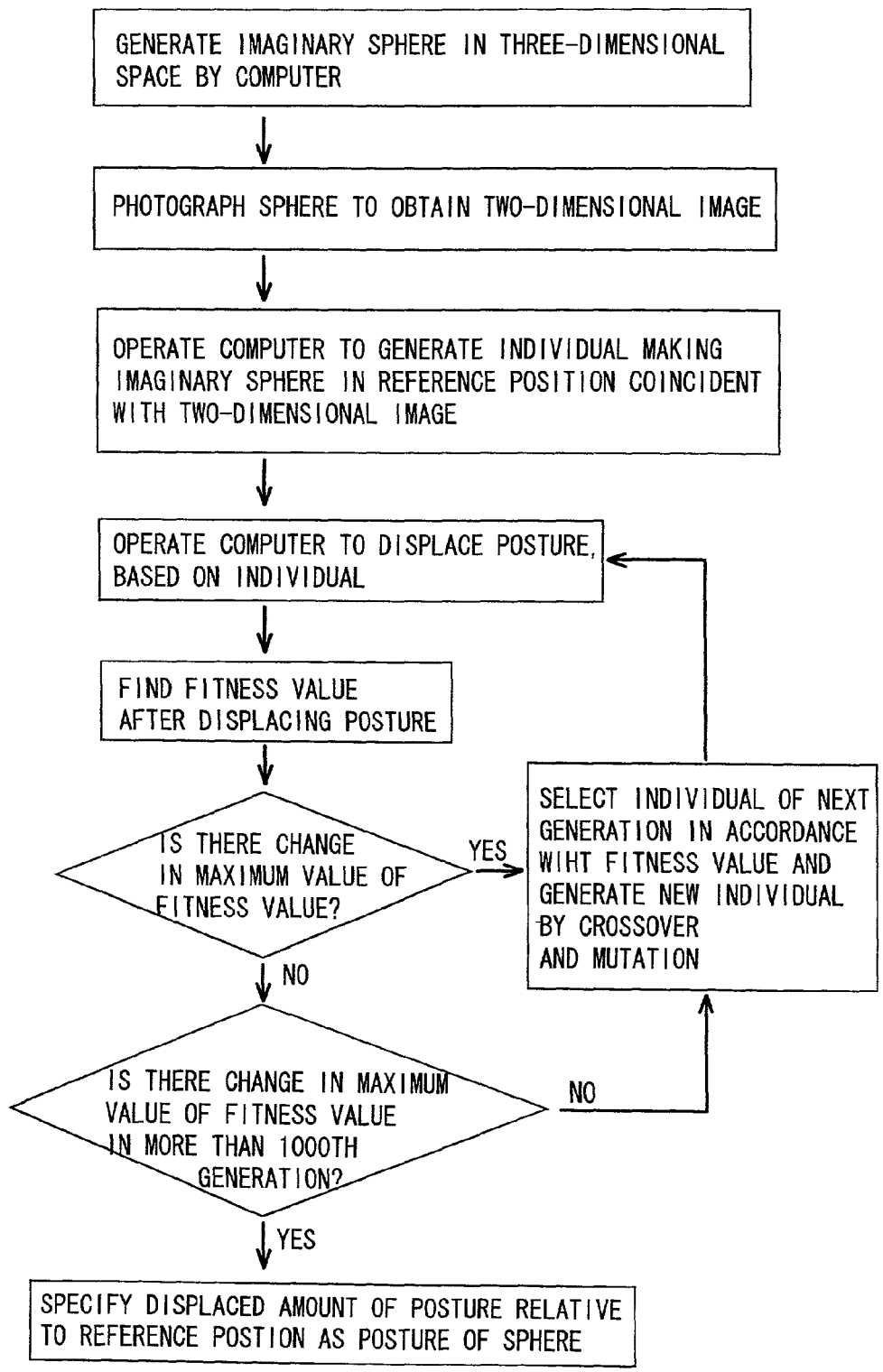
FIG. 2 is a flowchart of the steps of specifying the posture of a sphere.

The posture recognition program is produced on the basis of the flowchart shown in FIG. 2. The posture recognition program includes steps of forming an imaginary sphere in an imaginary three-dimensional space on the basis of a sphere to be measured, allowing an operation of displacing the posture of the imaginary sphere, namely, magnifying and minifying, moving, and rotating the posture thereof, and specifying a displacing operation of making the imaginary sphere viewed in a direction in which the posture of the imaginary sphere is coincident with that of a photographed two-dimensional image of the sphere.

For example, the posture recognition program is used to form an imaginary sphere similar to a golf ball to be measured, give marks to the surface of the imaginary sphere as in the case of an actual golf ball, set an arbitrary posture of the formed imaginary sphere as a reference posture, and set a direction in which the imaginary sphere set at the reference posture is viewed. Thereafter the computer 15 executes the operation of magnifying and minifying, moving, and rotating the posture of the imaginary sphere appropriately in such a way that the posture thereof is coincident with that of a photographed golf ball image.

In addition to the above-described processing, the operation of the computer includes binarization of converting the display of the photographed two-dimensional sphere image into white and black. Owing to the binarization, by giving a large number of black marks to the surface of a white golf ball used as the sphere to be measured, the black marks become clear. Thus it is possible to automatically recognize the marks on the photographed golf ball image and automatically obtain the coordinate value of each mark on the golf ball image.

An amount of the displacement of the imaginary sphere resulting from the operation of displacing its posture is programmed in such a way that the displacement amount is specified by using a computation based on the Genetic Algorithms. That is, computations are performed for a plurality of individuals corresponding to the posture displacement operation, evaluations for a large number of computed results are determined by a fitness value based on a specific function, namely, a objective function, a displacement amount which provides an excellent computed result is left at a high probability, and the computations are repeatedly performed. In this manner, an optimum displacement amount is derived. The posture of the imaginary sphere based on the derived optimum displacement amount is specified as the posture of the photographed two-dimensional image of the sphere. The posture of the imaginary sphere is specified for each of the photographed two-dimensional images of the sphere in finding the rotational amount of the sphere and the direction of its rotational axis.

Figure 3:
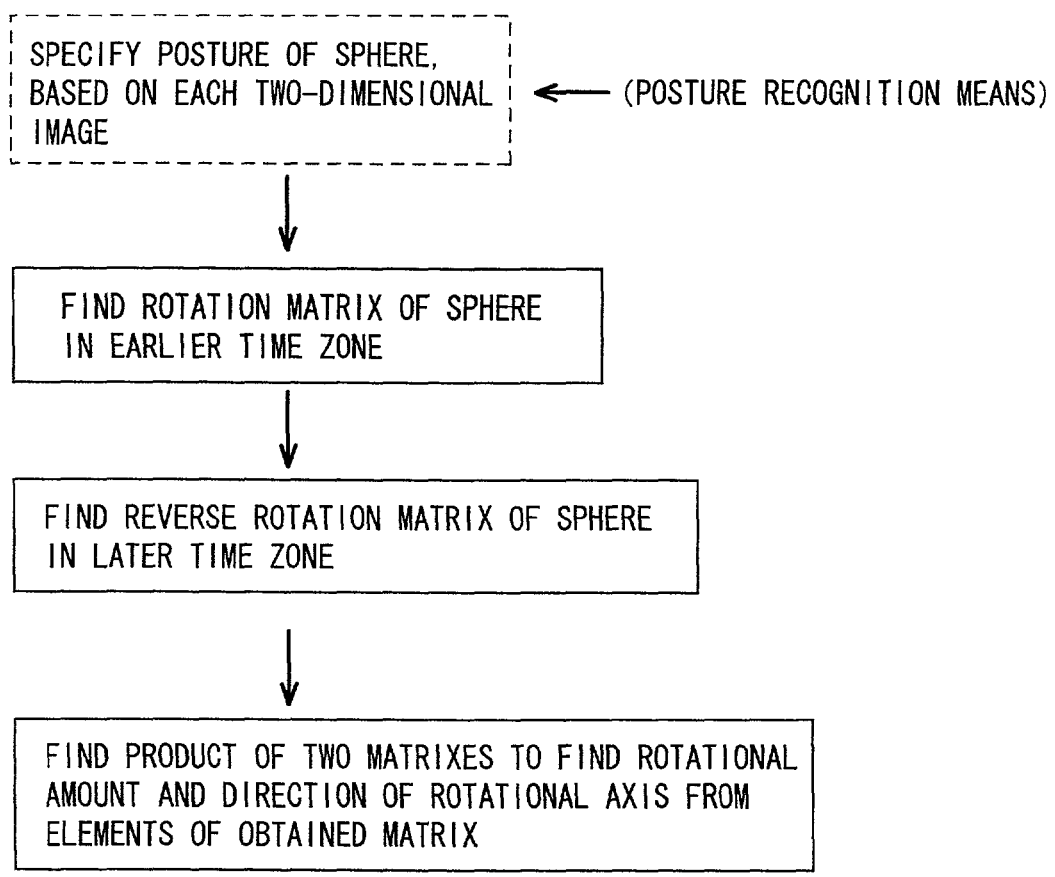
FIG. 3 is a flowchart of the steps of measuring and computing the rotational amount of the sphere and the direction of its rotational axis.

The above-described computing means is recorded in the hard disk 15a of the computer 15 in the form of a program. The program for the computing means is produced on the basis of the flowchart shown in FIG. 3. The rotational amount of the sphere and the direction of the photographed sphere are automatically computed from data of a three-dimensional posture of the sphere in a time zone before and after the posture of the photographed two-dimensional image of the sphere is specified.

The measuring apparatus 10 carries out the method of measuring the three-dimensional posture of the sphere, its rotational amount, and the direction of its rotational axis, as described in detail below.

Figure 4A:
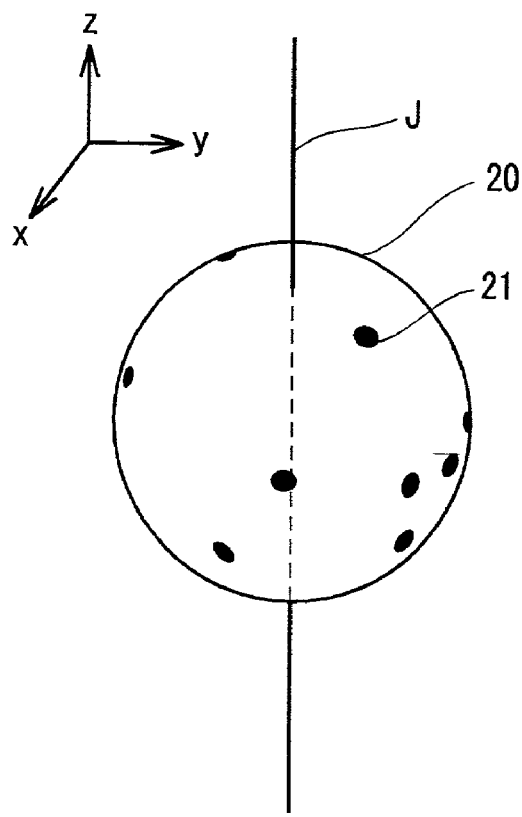
FIG. 4A is a perspective view showing positions of marks given to the sphere.
Figure 4B:
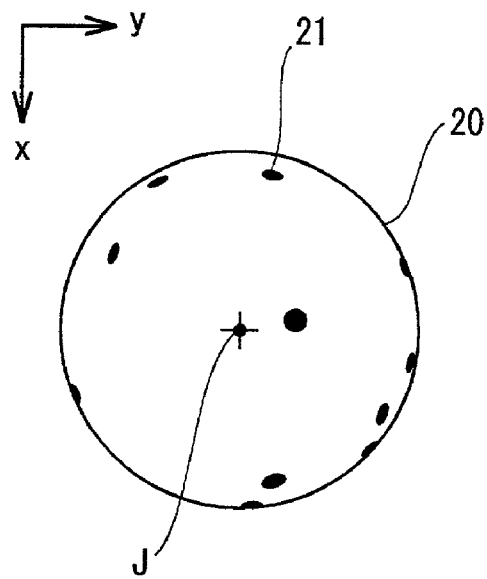
FIG. 4B is a plan view showing the positions of the marks given to the sphere.
Figure 4C:
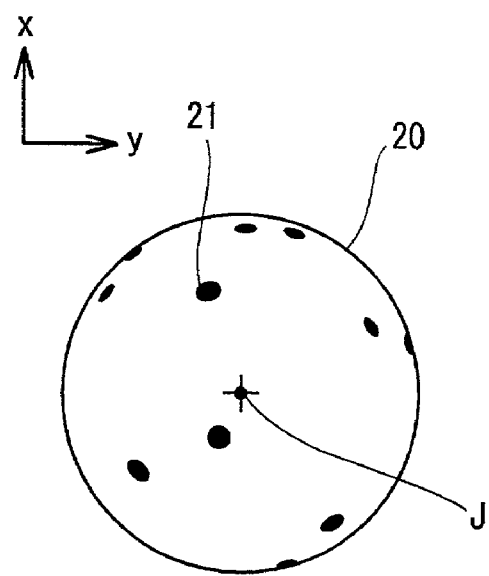
FIG. 4C is a bottom view showing the postions of marks given to the sphere.

A golf ball is used as an example of the sphere which is measured in its rotational amount and the direction. Initially, before a measuring operation is performed, as shown in FIGS. 4A, 4B, and 4C, a large number of black marks 21 are given to the surface of a golf ball 20 which is measured in its rotational amount and the direction.

The marks 21 are so given as to allow them to be symmetrical once with respect to a rotation axis J passing through the center of the golf ball 20, when the golf ball 20 has rotated on the rotation axis J at an angle obtained by dividing 360° by one. That is, the marks 21 are given at random to the surface of the golf ball 20. Instead of dividing 360° by one, the marks 21 may be given to the surface of the golf ball 20 in such a way that the marks 21 are symmetrical with respect to the rotation axis J passing through the center of the golf ball 20, when the golf ball 20 has rotated on the rotation axis J at an angle obtained by dividing 360° by a natural number of five or less.

Figure 10:
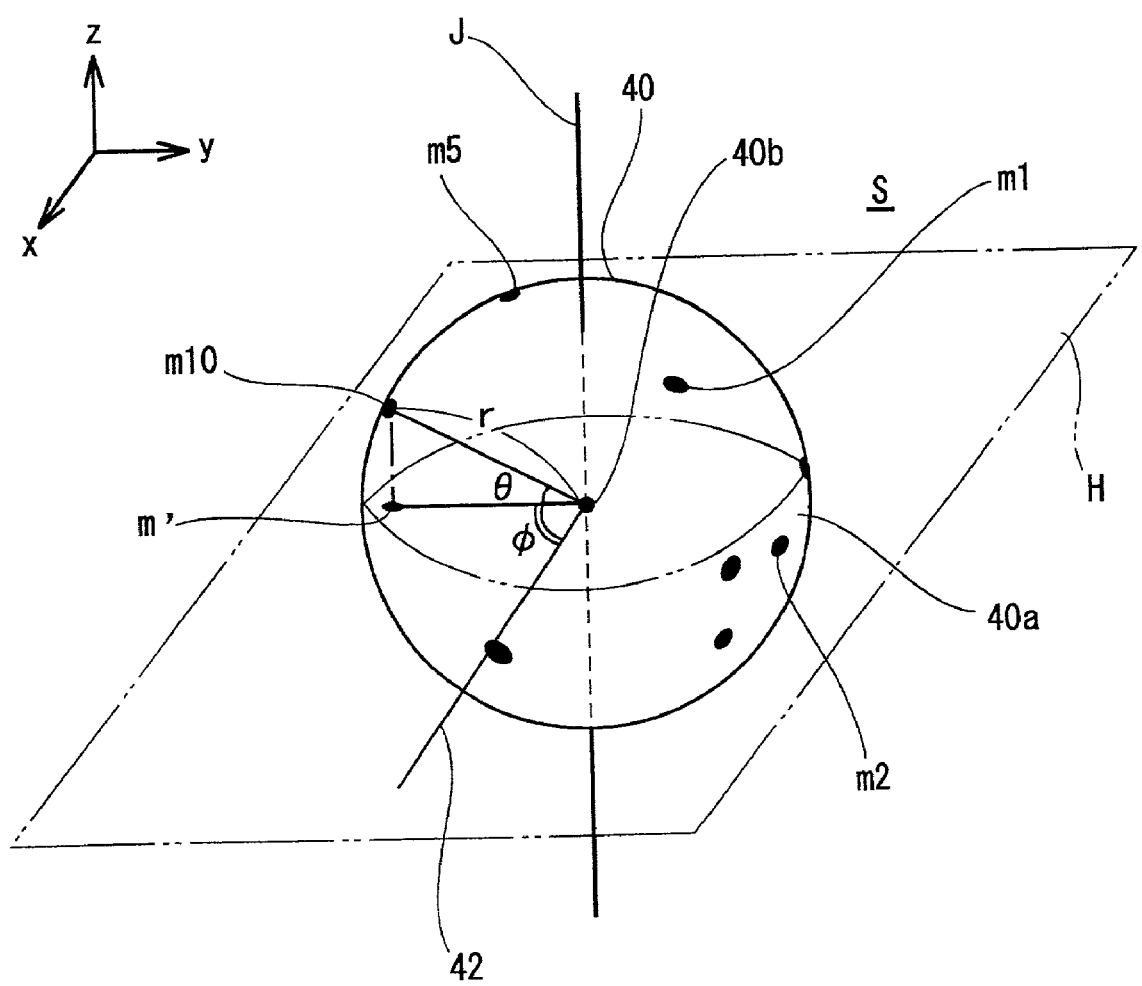
FIG. 10 is a schematic perspective view showing the relationship between a golf ball to be measured and marks.

The three-dimensional coordinate value of each mark 21 given to the surface of the golf ball 20 in the above-described manner is read with a three-dimensional measuring device. As the coordinate for reading the three-dimensional coordinate value of each mark 21, a polar coordinate is adopted, as shown in FIG. 10 to record a coordinate value r thereof in a radial direction, an angle $\theta$ thereof in a meridian direction, and an angle $\phi$ thereof in an azimuth direction. The coordinate for reading the three-dimensional coordinate value of each mark 21 is not limited to the polar coordinate.

Figure 5:
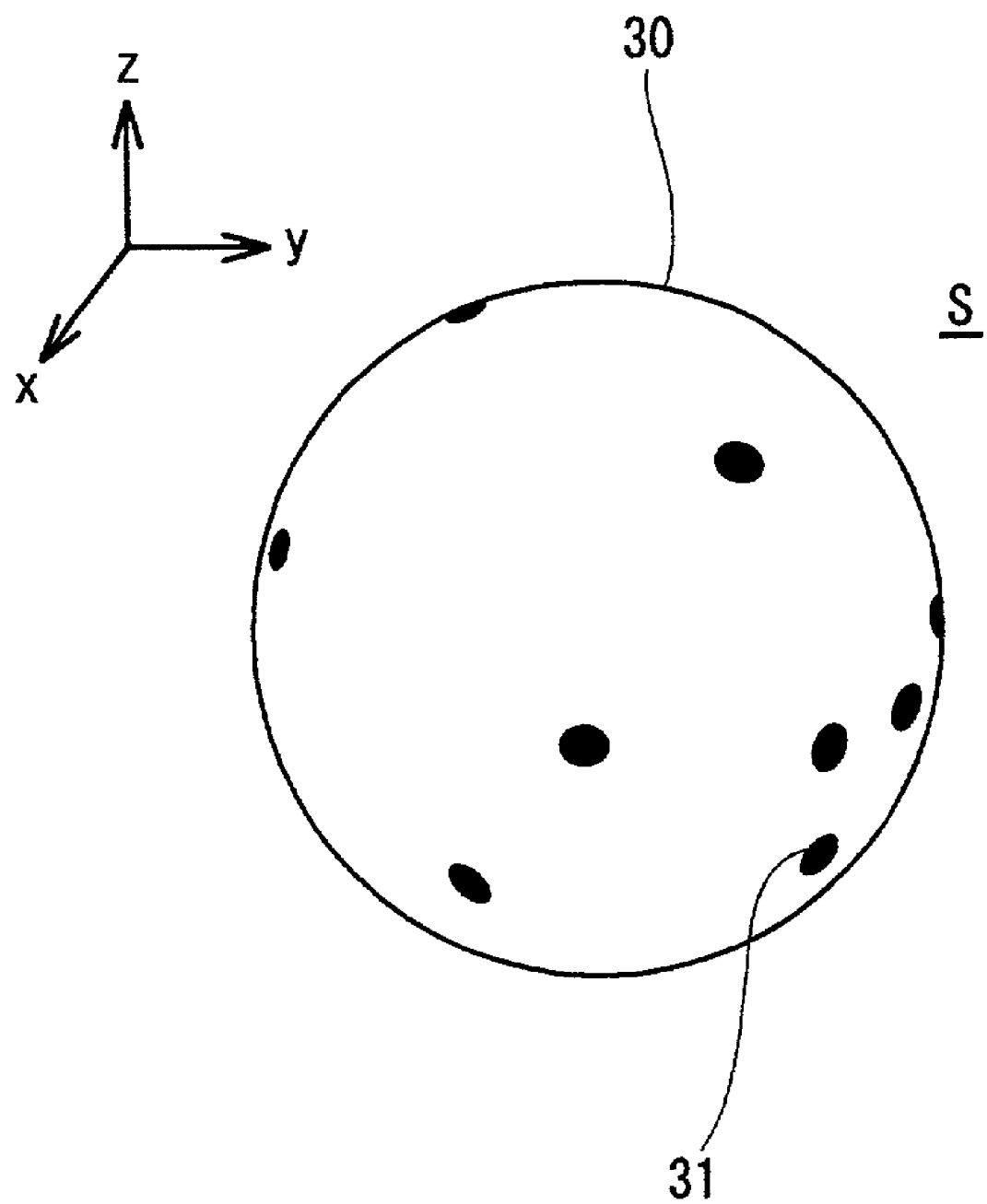
FIG. 5 is a schematic view showing an imaginary sphere formed in an imaginary three-dimensional coordinate space.

As shown in FIG. 5, the operation of a posture recognition program provided inside the computer 15 is started to form an imaginary sphere 30 similar to the golf ball 20 in an imaginary three-dimensional coordinate space S of a display screen 18 of the computer 15. Marks 31 are given to the imaginary sphere 30 at positions thereof corresponding to the positions of the golf ball 20 expressed by the numerical value on the polar coordinate (r, θ, φ). Although the polar coordinate is used in giving the mark 31 to the surface of the imaginary sphere 30, computations are performed by the posture recognition program which converts the numerical values of the polar coordinate into those of a rectangular coordinate. A given posture of the imaginary sphere 30 thus formed is set as a reference posture, and a direction in which the imaginary sphere 30 is viewed is set to a minus X-direction.

When preparation to be made before the measurement terminates, the CCD camera 11 is located at a position where the CCD camera 11 can photograph the golf ball 20 flying in rotation. When the hit golf ball 20 is to be photographed, the CCD camera 11 is disposed beside a hitting position. The distance between the CCD camera 11 and the golf ball 20 and the magnification of the lens of the CCD camera 11 are appropriately adjusted to allow the image of the golf ball 20 to be photographed in a large size.

In the above-described disposition of the CCD camera 11, the micro-flashes 12-1, 12-2 are emitted once respectively at predetermined intervals, when the golf ball 20 passes the CCD camera 11. Thereby the image memory 15b obtains a two-dimensional image of two spheres. The image data obtained by photographing the golf ball 20 is converted into binary data of white and black by using a binarizing program. Thereafter, for the image of each of the two golf balls 20, a measuring cursor is disposed on the mark 21 which is on the display screen 18 to read the two-dimensional coordinate value of each mark 21, with the upper left corner of the display screen 18 set as the origin. Read values are recorded on the hard disk 15a.

As described above, for each of images of the two photographed golf balls 20, the operation of magnifying and minifying, moving, and rotating the posture of the imaginary sphere 30 prepared in advance are performed by using the posture recognition program in such a way that the posture of the imaginary sphere 30 is coincident with that of each of the two images of the golf ball 20. In this operation, the following six kinds of variables are set: The scale s that is used as the variable relating to the magnification and minification of the imaginary sphere 30, two independent variables y and z relating to the operation for moving the imaginary sphere 30 along each of the rectangular coordinates in an XZ plane vertical to the minus X-direction in which the imaginary sphere 30 is viewed, and rotation angles, namely, three independent variables (α, β, γ) relating to the operation for rotating the imaginary sphere 30 three-dimensionally around the abscissa (X-axis), the ordinate (Y-axis), and the vertical axis (Z-axis) which are the rectangular coordinates of the imaginary three-dimensional coordinate space. The group of the six variables is specified as one individual. To code the six variables, the numerical value of each of the six variables is converted from a decimal number into not less a 5-bit binary number nor more than a 20-bit binary number by setting one digit of the binary number to one bit.

By using the table of random numbers, the computer 15 arbitrarily forms not less than two kinds of individuals nor more than 1000 kinds of individuals which are used as a first generation and have different numerical values of the six variables. The computer 15 executes computation processing for displacing the imaginary sphere 30 placed in the reference posture, by using the six variables of each of not less than two kinds of individuals nor more than 1000 kinds of individuals. After the computation processing terminates, by using the program, the computer 15 executes processing of reading the projected coordinate value of each mark 31 in the two-dimensional YZ coordinate in the direction in which the posture-displaced imaginary sphere 30 is viewed. Only marks on the hemisphere which can be viewed in the imaginary sphere-viewing direction are read.

The computer 15 executes processing of finding values by substituting the coordinate value (expressed by Bj. j is equivalent to sign of each mark)) of each mark 31 on the imaginary sphere 30 and the coordinate value (expressed by Ai. i is equivalent to sign of each mark)) on each mark 21 of the photographed golf ball 20 read and recorded previously into the following equation (1) which is an objective function f.

[Equation 1]

$$f = \sum_{i=1}^{n} \min j\{(\text{distance}(Ai, Bj)^2)\} \quad (1)$$

where n is the number of marks.

In the equation (1), distance $(Ai, Bj)^2$ expresses the square of the distance between two marks, minj expresses a minimum value for j (j=1 to n, n is the number of marks), and Σ is the summation for i (i=1 to n, n is the number of marks). That is, the equation (1) is the summation for the mark i given to the surface of the photographed golf ball. Of all the marks on the surface of the photographed golf ball and the marks on the imaginary sphere, those which cannot be read in the viewing direction are not computed by using the equation (1), as described above. The equation (1) is a function opening upward. That is, the equation (1) takes a large value when the degree of coincidence between the marks on the photographed golf ball and the marks on the imaginary sphere is low. On the other hand, the equation (1) takes a small value when the degree of the coincidence therebetween is high. The equation (1) takes a minimum value of zero when all the marks on the photographed golf ball are coincident with all the marks on the imaginary sphere respectively.

The computation of the objective function is performed for each of the individuals to find the fitness value of each individual. The computation is called a fitness value computation. In the Genetic Algorithms, a fitness value having a large numerical value is more favorable a fitness value having a small value. Thus a reciprocal number of the objective function is set as the fitness value. Based on the fitness value of each individual, the individual capable of leaving a descendant to the next generation in a generation alternation is selected in such a way that m individuals are selected from m groups consisting of individuals although duplication is permitted. The individual having a large fitness value is selected more than the individual having a small fitness value. In the embodiment, a roulette method of selecting individuals at the rate proportional to the fitness value is adopted.

For the individual selected in the above-described manner, a descendant of the next generation is generated by appropriately performing a reproduction including a crossover and a mutation. In the embodiment, as shown in FIG. 6A, as the crossover, a one-point crossover of exchanging elements of corresponding digits of binarized variables with each other is executed. It is possible to perform the crossover and the mutation by appropriately combining the one-point crossover with a two-point crossover shown in FIG. 6B or with a uniform crossover. The mutation can be performed by a deletion, an exchange, an insertion of an arbitrary digit of a variable or by reversing 0 and 1 of a digit to each other. In the embodiment, the mutation is executed by reversing 0 and 1 of a digit.

The computer 15 repeatedly executes a series of the operations including the computation of the fitness value, the selection of the individual, and the mutation. When a maximum value of the fitness value remains unchanged through 1000 generations in the operations, the computation terminates. The value of the six variables of the individual which makes the fitness value maximum is determined as an optimum solution of the posture displacement of the imaginary sphere. The three-dimensional posture of the golf ball 20 is specified by the individual.

Figure 9:
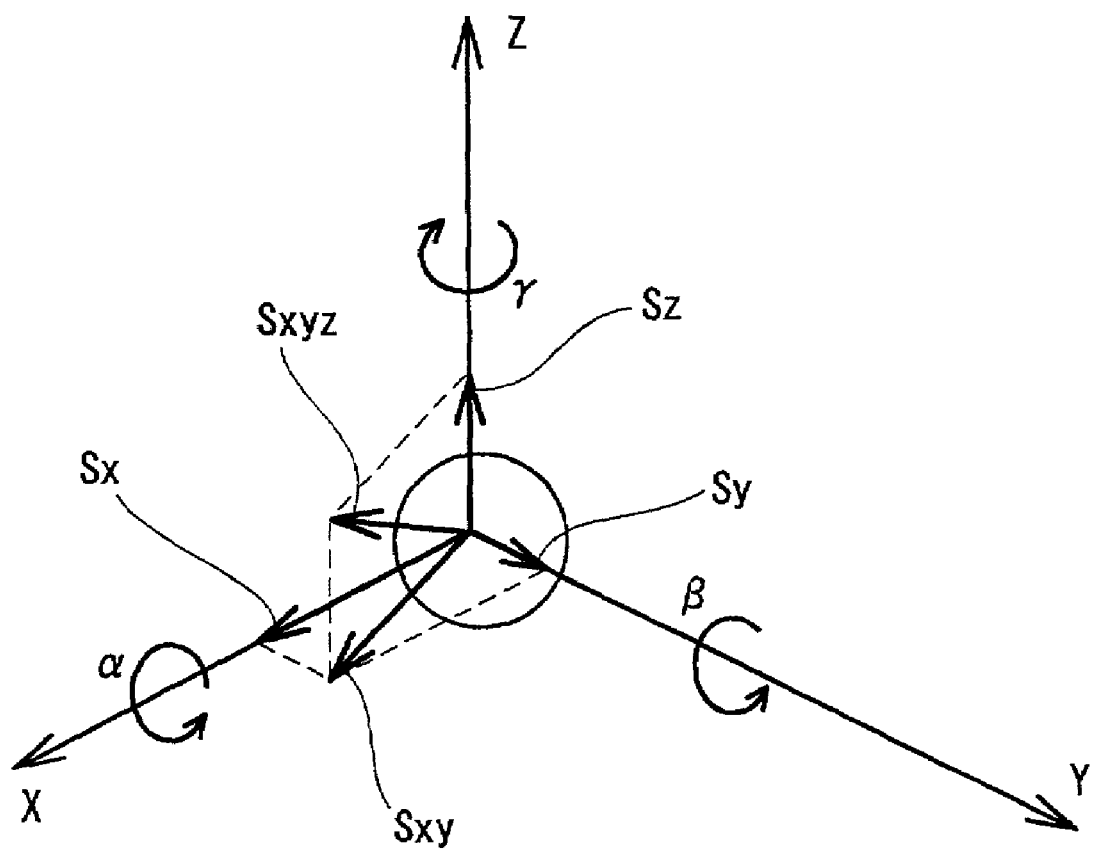
FIG. 9 is an explanatory view showing components of the rotational speed of the sphere.

More specifically, based on the values of the rotational angles ($\alpha$, $\beta$, $\gamma$) around the X-axis, the Y-axis, and the Z-axis of the three-dimensional coordinate space, shown in FIG. 9, of the individual which makes the fitness value maximum, a rotation matrix of three rows and three columns is found. The found rotation matrix determines the posture of the golf ball 20. That is, rotation matrixes Rx, Ry, and Rz for rotating the golf ball 20 on the X-axis, the Y-axis, and the Z-axis respectively are expressed as follows:

[Equation 2]

$$Rx = \begin{pmatrix} 1 & 0 & 0 \\ 0 & \cos\alpha & -\sin\alpha \\ 0 & \sin\alpha & \cos\alpha \end{pmatrix}$$
$$Ry = \begin{pmatrix} \cos\beta & 0 & \sin\beta \\ 0 & 1 & 0 \\ -\sin\beta & 0 & \cos\beta \end{pmatrix} \quad (2)$$
$$Rz = \begin{pmatrix} \cos\gamma & -\sin\gamma & 0 \\ \sin\gamma & \cos\gamma & 0 \\ 0 & 0 & 1 \end{pmatrix}$$

The rotation matrix R for specifying the posture of the golf ball 20, specified by the posture recognition program, from the reference posture of the imaginary sphere is expressed as follows from the rotation matrix Rx, Ry, and Rz for rotating the golf ball 20 on the X-axis, the Y-axis, and the Z-axis respectively:

[Equation 3]

$$R = Rz\,Ry\,Rx \quad (3)$$

Computation and evaluation of the fitness value similar to those described above are executed for the second golf ball 20. A rotation matrix is determined from rotational angles ($\alpha'$, $\beta'$, $\gamma'$) specifying the posture of the second golf ball 20. After the three-dimensional posture of the image of each golf ball is specified, the rotational amount of the golf ball 20 is found by the product of the rotation matrix for specifying the posture of the first golf ball 20 and a reverse matrix of the rotation matrix for specifying the posture of the second golf ball 20 by starting the operation of a program serving as a computations means.

That is, supposing that a rotation matrix for specifying the posture of the first golf ball 20 specified by the equation (3) is R1, a rotation matrix for specifying the posture of the second golf ball 20 is R2, and a rotation matrix for making the posture of the first golf ball 20 coincident with that of the second golf ball 20 is R12, the rotation matrix R12 is found by an equation (4) shown below:

[Equation 4]

$$R_{12} = R_2 R_1^{-1} = \begin{pmatrix} r_{11} & r_{12} & r_{13} \\ r_{21} & r_{22} & r_{23} \\ r_{31} & r_{32} & r_{33} \end{pmatrix} \quad (4)$$

where $r_{11}$ through $r_{33}$ are elements of matrix.

Figure 8:
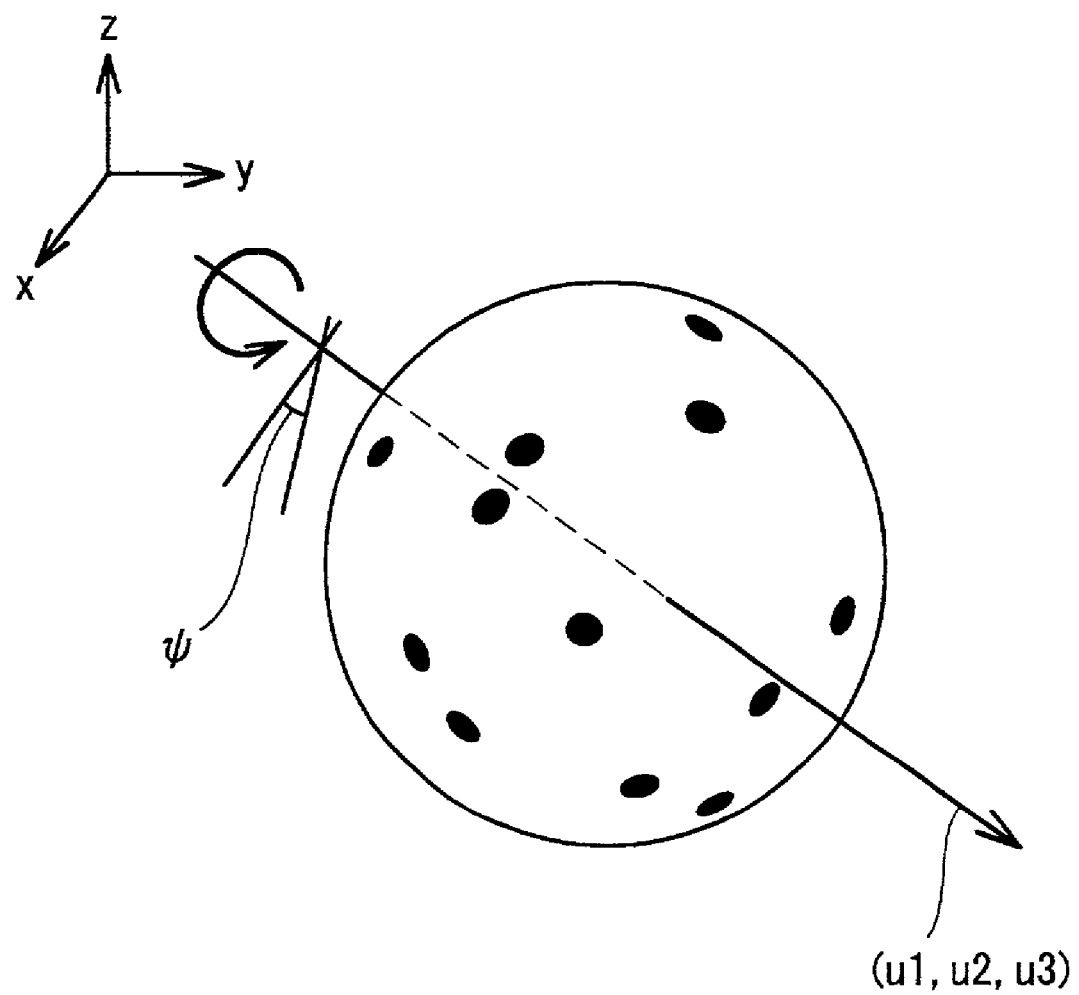
FIG. 8 is an explanatory view showing the direction of the rotational axis of the sphere and its rotational angle.

Directions (u1, u2, u3) of the rotational axis and a rotational angle $\Psi$ at the time of a coordinate conversion shown in FIG. 8 are found by equations (5) and (6) shown below, when the rotation matrix R12 shown by the equation (4) is determined:

[Equation 5]

$$(u_1, u_2, u_3) = \frac{(-r_{23}+r_{32}, r_{13}-r_{31}, -r_{12}+r_{21})}{\sqrt{(r_{23}-r_{32})^2 + (r_{13}-r_{31})^2 + (r_{12}-r_{21})^2}} \quad (5)$$

[Equation 6]

$$\psi = \cos^{-1}\left(\frac{r_{11}+r_{22}+r_{33}-1}{2}\right) \quad (6)$$

The rotational amount is found from the found rotational angle $\Psi$ and the interval between the time at which one image is photographed and the time at which the other image is photographed. As shown in FIG. 9, it is possible to split the found rotational amount into components Sx, Sy, and Sz around each coordinate axis and consider the components Sx, Sy, and Sz as a back spin component, an axial spin component, and a side spin component respectively.

By determining the posture of the second golf ball 20 on the basis of the posture of the first golf ball 20, the rotation matrixes from the posture of the first golf ball 20 to the posture of the second golf ball 20 can be directly found. But the computation for finding the rotation matrix cannot be started, unless the posture of the first golf ball 20 is fixed. Thus in finding the posture of the first golf ball 20 and that of the second golf ball 20 with respect to the same basic posture of the imaginary sphere on the display screen, the computing speed can be quickened by using two computers or by operating a computer which is capable of accomplishing parallel processing. The rotational amount of one ball image with respect to that of the other ball image is found from successive images before and after each of the images to successively find the rotational amount of the sphere.

The embodiment of the present invention is not limited to the above-described one. For example, the maximum value of the fitness value can be determined by performing computations for 1000th generation to 10000th generation in the case where high accuracy is desired. The fitness value can be determined by performing computations for 100th generation to 1000th generation in the case where an efficient computation is desired.

To inspect the above-described measuring method, examples 1–4 in which the above-described measuring method was used and the comparison examples 1–4 in which the conventional method was used will be described below by comparing both with each other.

In the examples 1–4 and the comparison examples 1–4, a golf ball 40 shown in FIG. 10 was used as the sphere to measure its rotational amount and the like. Twenty six black marks m1–m26 were given at random to the entire surface 40a of the golf ball 40 in such a way that the marks m1–m26 were symmetrical once with respect to the rotation axis, when the golf ball 40 rotated by 360°. As shown in table 1, the position of each of the marks m1–m26 was specified by a polar coordinate determined by an angle φ (angle in azimuth direction) formed between a normal 42 and a straight line connecting a point m' projected from each mark to an imaginary horizontal surface H passing through the center 40b of the golf ball 40 and the center 40b thereof to each other and an angle θ (angle in meridian direction) formed between a straight line connecting each mark and the center 40b to each other and an imaginary plane H. Because the golf ball 40 was a sphere, the radius thereof is set to one to facilitate computations. The angle θ disposed above (upper hemisphere of the golf ball 40) the imaginary horizontal surface H is set to positive, whereas the angle θ disposed below (lower hemisphere of the golf ball 40) the imaginary horizontal surface H is set to negative.

TABLE 1

| Mark | θ (degree) | φ (degree) |
|---|---|---|
| Upper hemisphere | | |
| m15 | 22.020 | 8.042 |
| m17 | 44.782 | 28.145 |
| m12 | 5.640 | 41.375 |
| m11 | 15.019 | 56.813 |
| m9 | 42.620 | 85.510 |
| m10 | 74.150 | 108.000 |
| m5 | 5.640 | 113.375 |
| m8 | 44.782 | 115.855 |
| m4 | 5.103 | 164.395 |
| m25 | 24.545 | 197.038 |
| m26 | 49.089 | 216.000 |
| m19 | 22.020 | 296.042 |
| m18 | 44.782 | 316.145 |
| m16 | 22.020 | 351.958 |
| Lower hemisphere | | |
| m20 | −5.103 | 303.605 |
| m21 | −23.992 | 298.044 |
| m22 | −14.392 | 277.615 |
| m23 | −5.103 | 252.000 |
| m24 | −60.133 | 252.000 |
| m1 | −24.545 | 198.962 |
| m2 | −24.545 | 161.038 |
| m3 | −44.782 | 136.145 |
| m6 | −5.640 | 97.800 |
| m7 | −34.293 | 84.959 |
| m13 | −15.000 | 0.000 |
| m14 | −42.620 | 337.510 |

Figure 11A:
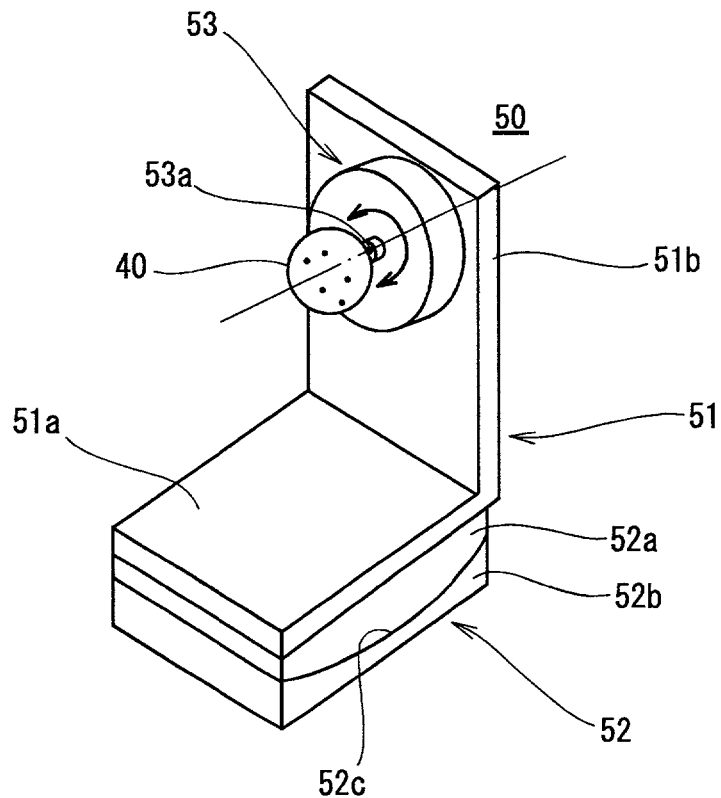
FIG. 11A is a perspective view showing a golf ball rotation/displacement apparatus.
Figure 11B:
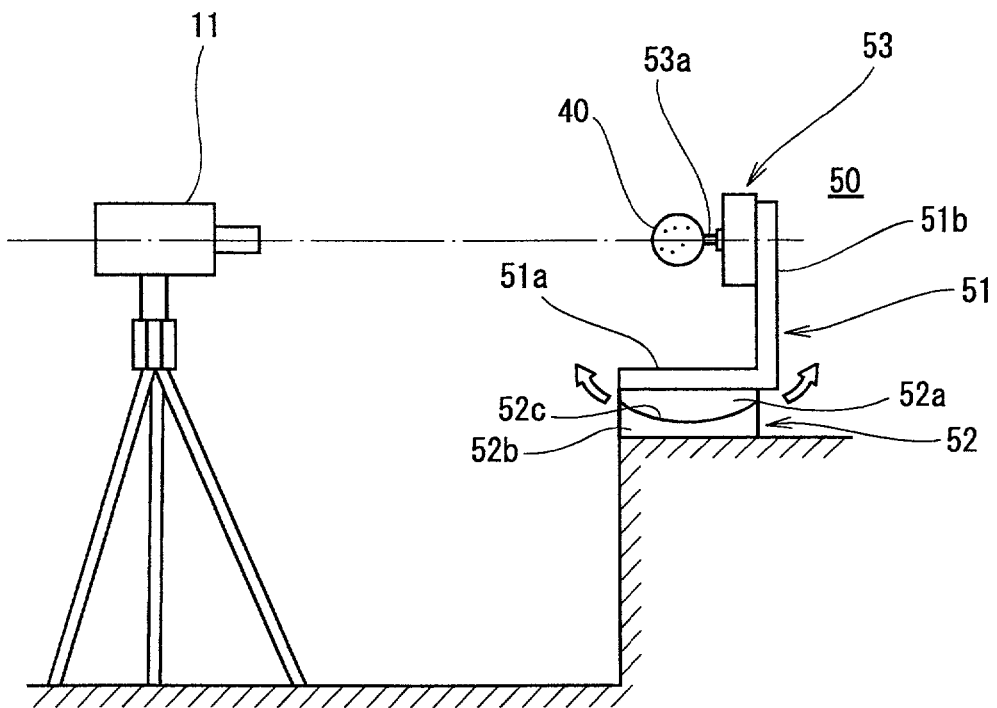
FIG. 11B is a side view showing the golf ball rotation/displacement apparatus.

To examine that the method of the present invention for measuring the three-dimensional posture of the sphere is capable of correctly measuring the rotational amount (rotational angle) of the sphere and the inclination of the rotational axis thereof, the golf ball 40 flying and rotating was not measured, but a golf ball rotation/displacement apparatus 50, shown in FIGS. 11A and 11B, capable of specifying the rotational amount of the sphere and the inclination of the rotational axis thereof was used for measurement.

The golf ball rotation/displacement apparatus 50 has an L-shaped angle part 51, a base part 52 disposed below a horizontal portion 51a of the angle part 51, and a rotational part 53 mounted on a vertical portion 51b of the angle part 51. The base part 52 has an upper portion 52a and a lower portion 52b which contacts the upper portion 52a along a circular arc-shaped sliding surface 52c which is an inclined stage. The upper portion 52a is rotatable along the sliding surface 52c by a certain angle in directions shown with white arrows of FIG. 11B. When the upper portion 52a is displaced, the angle part 51 fixed to the upper portion 52a inclines, and a rotational shaft 53a projecting from the rotational part 53 also inclines.

The rotational part 53 which is a rotational stage is capable of rotating at a certain angle on the rotational shaft 53a. Thus in the golf ball rotation/displacement apparatus 50, owing to the rotation of the upper portion 52a of the base portion 52, the rotational shaft 53a can be inclined at a desired angle, and thus the rotational angle of the rotation shaft 53a can be set as desired. In the examples 1–4 and the comparison examples 1–4, experiments were conducted in a condition that the inclination of the rotational shaft 53a was displaced by 15° with respect to a horizontal direction, and the rotational angle of the rotation shaft 53a was set to 40°. This condition is equivalent to taking a photograph, at an interval of 2 ms, of images of two golf balls flying at a rotational speed of about 3300 rpm on an axis inclining 15° with respect to the horizontal direction. The golf ball 40 was mounted on an end of the rotational shaft 53a in such a way that an extension line of the rotational shaft 53a passes through the center 40b of the golf ball 40.

After the CCD camera 11 was located at a position confronting the golf ball 40 mounted on the golf ball rotation/displacement apparatus in the above-described manner by appropriately setting the distance between the CCD camera 11 and the golf ball 40 and the emission situation of the micro-flashes 12-1 and 12-2, the image of the golf ball 40 whose rotational shaft 53a was horizontal was photographed. Thereafter the image of the golf ball 40 was photographed by rotating the golf ball 40 by 40° on the rotational shaft 53a which had an inclination of 15° with respect to the horizontal direction.

Figure 16A:
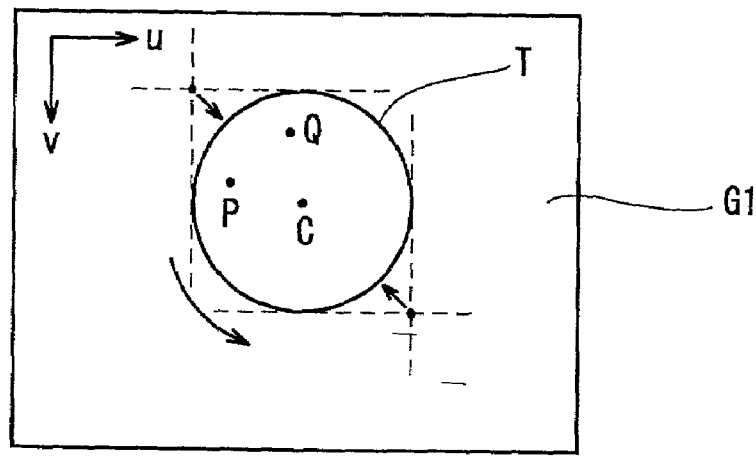
FIGS. 16A and 16B are a two-dimensional image obtained by a conventional measuring method respectively.
Figure 16B:
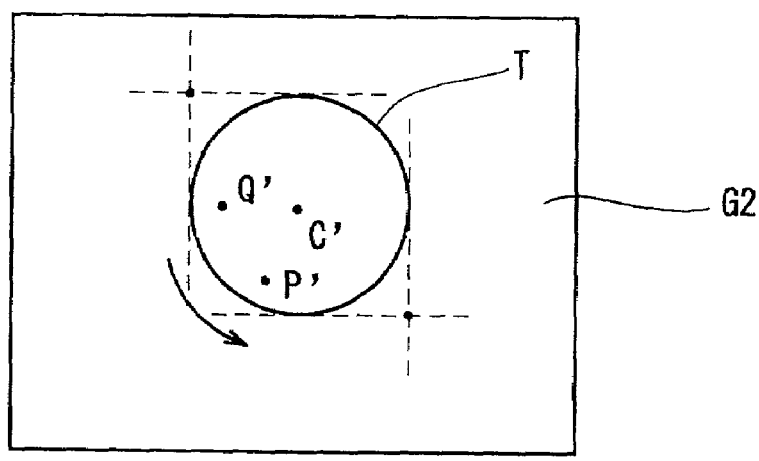
Figure 17A:
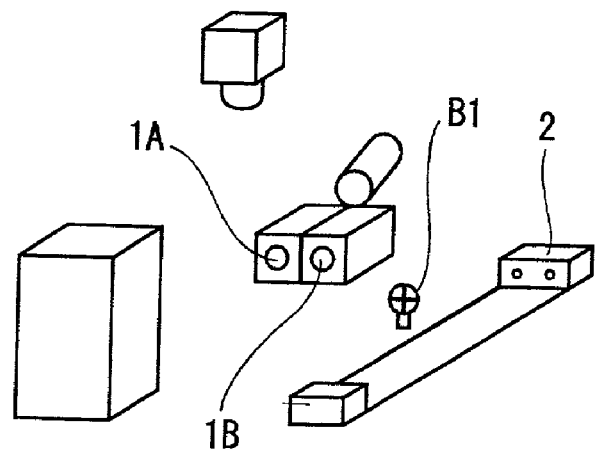
FIG. 17A is a schematic view showing a conventional measuring apparatus.
Figure 17B:
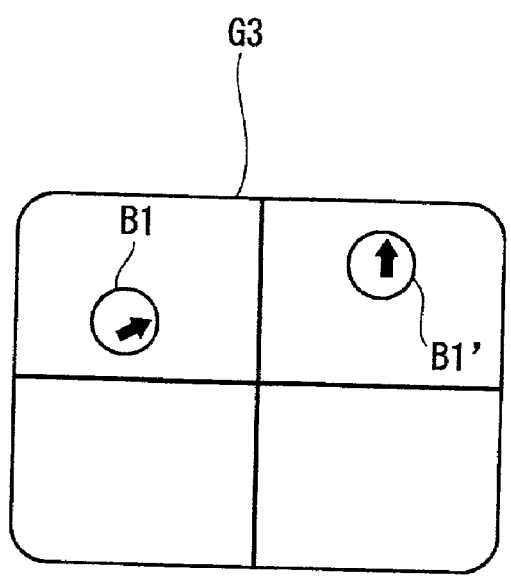
FIG. 17B shows a ball image obtained by the measuring apparatus shown in FIG. 17A.
Figure 18A:
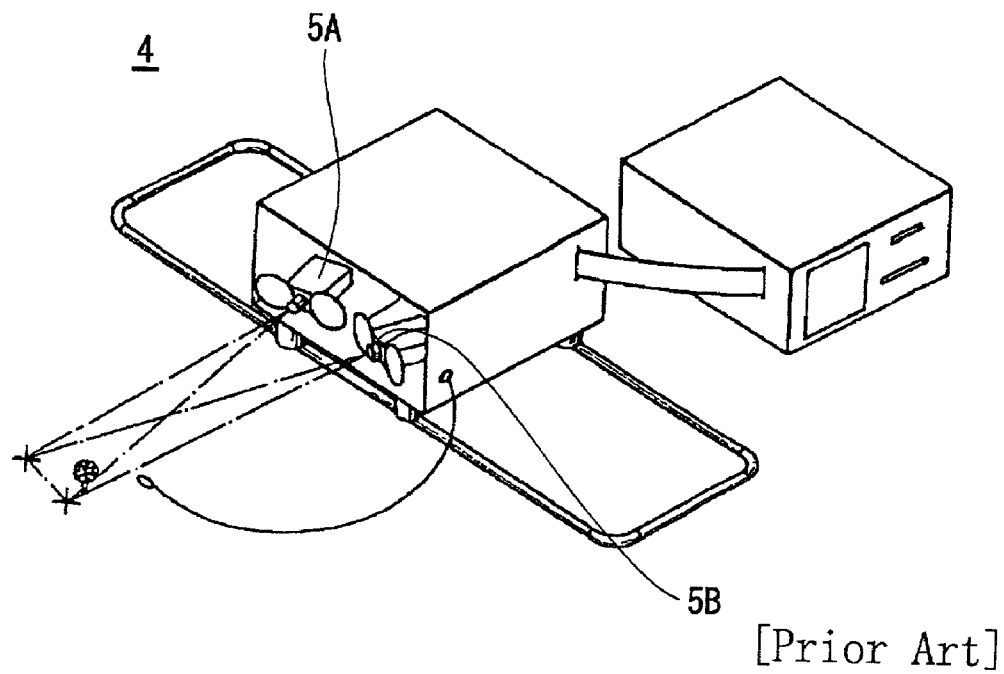
FIG. 18A is a perspective view showing another conventional measuring apparatus.
Figure 18B:
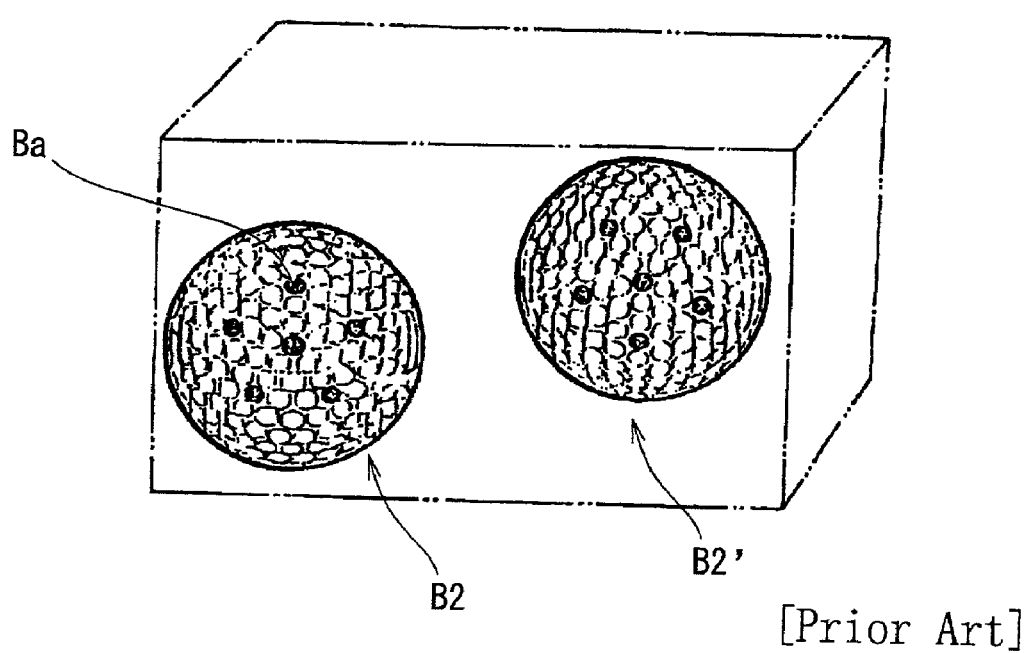
FIG. 18B is a perspective view showing a three-dimensional region showing a golf ball which has passed through a measuring region.
Figure 19:
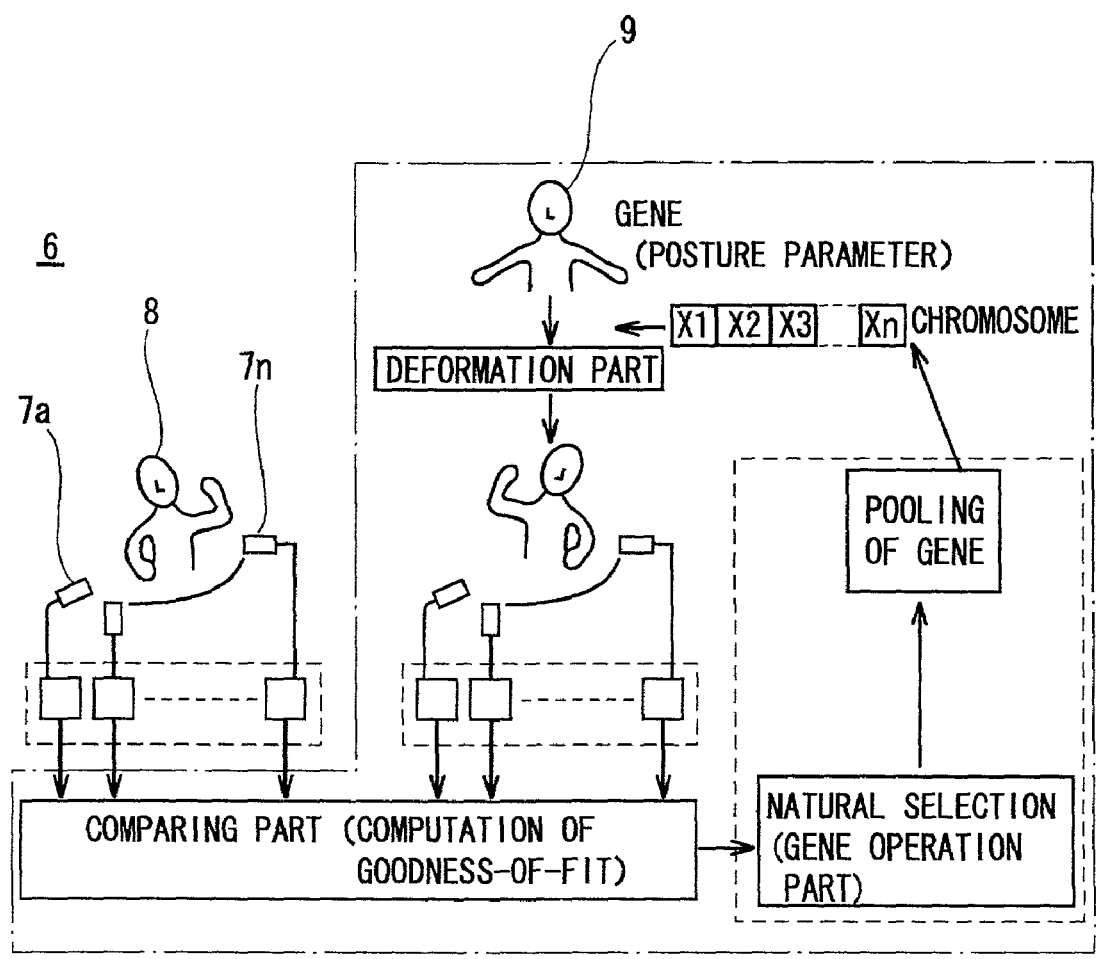
FIG. 19 is a schematic view showing a conventional posture detection apparatus using a Genetic Algorithms method.

Based on the image of each of the two photographed golf ball images, in the examples 1–4, the rotational amount (rotational angle) of the golf ball 40 and the inclination of its rotational axis were found a computation/measurement method based on the Genetic Algorithms. In the comparison examples 1–4, the rotational amount of the golf ball and the inclination of its rotational axis were found by using the conventional measuring method of U.S. Pat. No. 2,810,320 shown in FIGS. 16A and 16B. The results of the measurement were compared with each other.

EXAMPLE 1

In the example 1, the position of the CCD camera 11 was adjusted to allow the image of the golf ball 40 to be photographed in a large size and the contour of the golf ball 40 to be clear, and the manner of emitting light from the micro-flashes 12-1 and 12-2 was also adjusted. Initially the golf ball 40 mounted on the golf ball rotation/displacement apparatus 50 was photographed. The golf ball was photographed again by rotating the golf ball 40 by 40 degrees on the rotational shaft 53a which inclined by 15 degrees with respect to the horizontal direction. In this manner, two two-dimensional ball images 60 and 61 were displayed on the display screen. The ball images 60 and 61 were binarized by using the posture recognition program of the computer 15, and the marks m1–m26 on each of the ball images 60 and 61 were automatically recognized to read the two-dimensional coordinate value of each of the marks m1–m26.

An imaginary sphere on which the marks m1–m26 were given was generated on the display screen, similarly to the golf ball 40. Processing of making the posture of the imaginary sphere coincident with the posture of each of the ball images 60 and 61 was executed by performing an operation of magnifying and minifying, moving, and rotating the imaginary sphere placed in the reference position. The movement amount of the imaginary sphere made by the operation is found by computations based on the Genetic Algorithms. The following six kinds of variables were set: The scale s that was used as the variable relating to the magnification and minification of the imaginary sphere, the two independent variables y and z relating to the operation for moving the imaginary sphere, and the rotation angles ($\alpha$, $\beta$, $\gamma$) around the abscissa (X-axis), the ordinate (Y-axis), and the vertical axis (Z-axis) which are rectangular coordinates of the three-dimensional space. Fifty kinds of individuals having the six variables were prepared, and computations were performed. The numerical value of each of the six variables was converted from a decimal number into a 10-bit binary number.

In each generation, computations for displacing the imaginary sphere placed in the reference position were performed for each individual. A fitness value obtained on the basis of the equation (1) was computed for each individual. Based on the fitness value, a series of the operations including selection of the individual and a mutation were repeatedly executed. When a maximum value of the fitness value remains unchanged through 1000 generations in the operations, the computation terminates. The scale s that was used as the variable relating to the magnification and minification of the imaginary sphere with respect to the ball images 60 and 61, the independent variables y and z relating to the operation for moving the imaginary sphere, and the rotation angles ($\alpha$, $\beta$, $\gamma$) were set as the posture of the imaginary three-dimensional coordinate space of the golf ball 40 photographed on the ball images 60 and 61. The rotational amount of the golf ball of the example 1 and the inclination of its rotational axis were computed by the product of the rotation matrix for specifying the posture of the first golf ball and the reverse matrix of the rotation matrix for specifying the posture of the second golf ball. Table 2 shows the results of the measurement.

TABLE 2

| Set value of rotation/displacement apparatus | Rotational angle (°) | Inclination of rotational axis (°) |
|---|---|---|
|  | 40.0 | 15.0 |
| Example 1 | 40.2 | 14.9 |
| Example 2 | 39.8 | 15.1 |
| Example 3 | 39.7 | 15.3 |
| Example 4 | 40.5 | 15.4 |
| Comparison Example 1 | 40.4 | 14.5 |
| Comparison Example 2 | 40.7 | 14.2 |
| Comparison Example 3 | 41.6 | 13.1 |
| Comparison Example 4 | 43.1 | 13.2 |

EXAMPLE 2

In the example 2, the position of the CCD camera 11 was adjusted to allow the image of the golf ball to be photographed in a large size and the contour of the golf ball to be clear, and the manner of emitting light from the microflashes 12-1 and 12-2 were also adjusted. In this manner, ball images 62 and 63 shown in FIG. 13 were obtained. Similarly to the example 1, computations based on the Genetic Algorithms were performed to determine the rotational angle of the golf ball 40 and the inclination of its rotational axis. Table 2 shows the results of the measurement.

EXAMPLE 3

In the example 3, the position of the CCD camera 11 was adjusted to allow the image of the golf ball to be photographed in a large size and the contour of the golf ball to be clear, and the manner of emitting light from the microflashes 12-1 and 12-2 were also adjusted. In this manner, ball images 64 and 65 shown in FIG. 14 were obtained. Similarly to the example 1, computations based on the Genetic Algorithms were performed to determine the rotational angle of the golf ball 40 and the inclination of its rotational axis. Table 2 shows the results of the measurement.

EXAMPLE 4

In the example 4, the position of the CCD camera 11 was adjusted to allow the image of the golf ball to be photographed in a large size and the contour of the golf ball to be clear, and the manner of emitting light from the microflashes 12-1 and 12-2 were also adjusted. In this manner, ball images 66 and 67 shown in FIG. 15 were obtained. Similarly to the example 1, computations based on the Genetic Algorithms were performed to determine the rotational angle of the golf ball 40 and the inclination of its rotational axis. Table 2 shows the results of the measurement.

COMPARISON EXAMPLE 1

Figure 12:
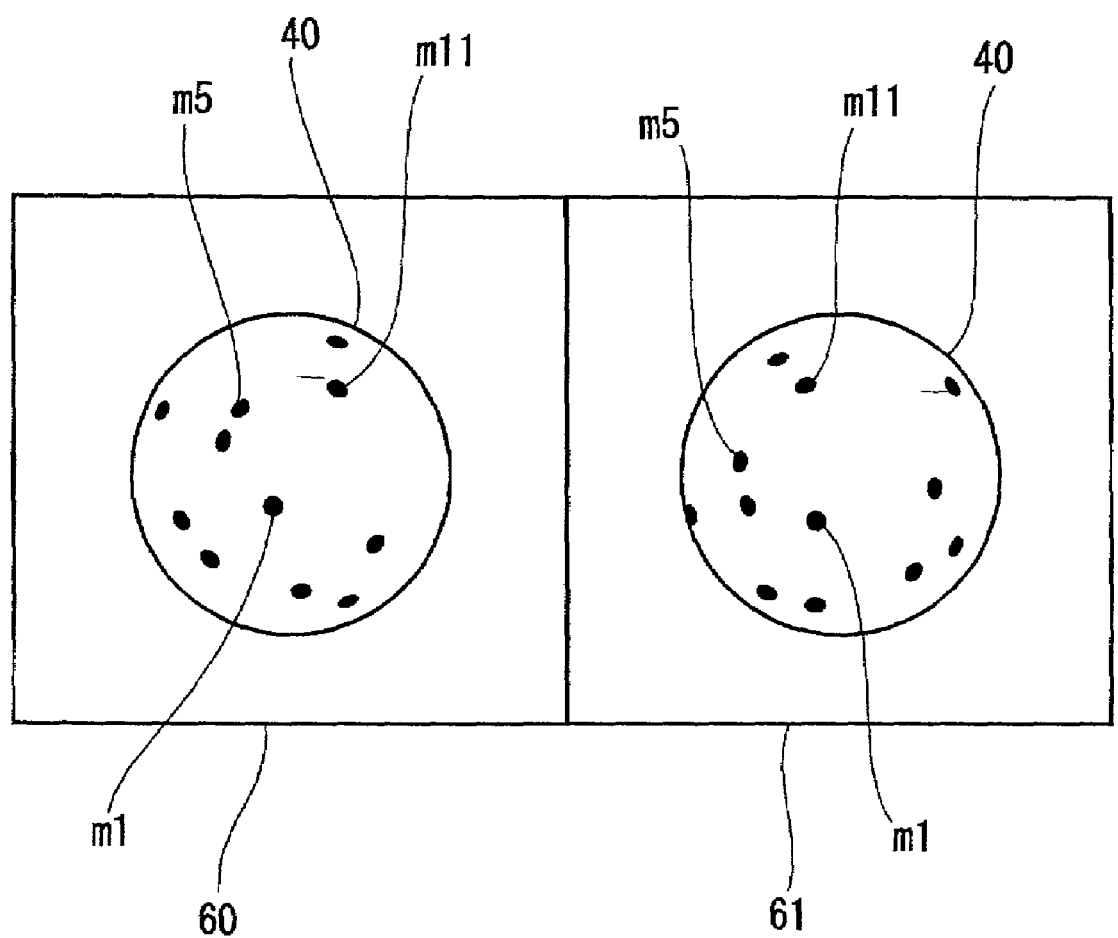
FIG. 12 shows an image of the golf ball which is photographed in a large size and clear in its contour.

In the comparison example 1, the radius of the sphere of each of the ball images 60 and 61 shown in FIG. 12, similarly to the example 1, was measured, and the coordinate of each of the two marks selected arbitrarily was measured. Based on the two marks, the rotational angle of the golf ball 40 and the inclination of its rotational axis were computed. Table 2 shows the results of the measurement.

COMPARISON EXAMPLE 2

Figure 13:
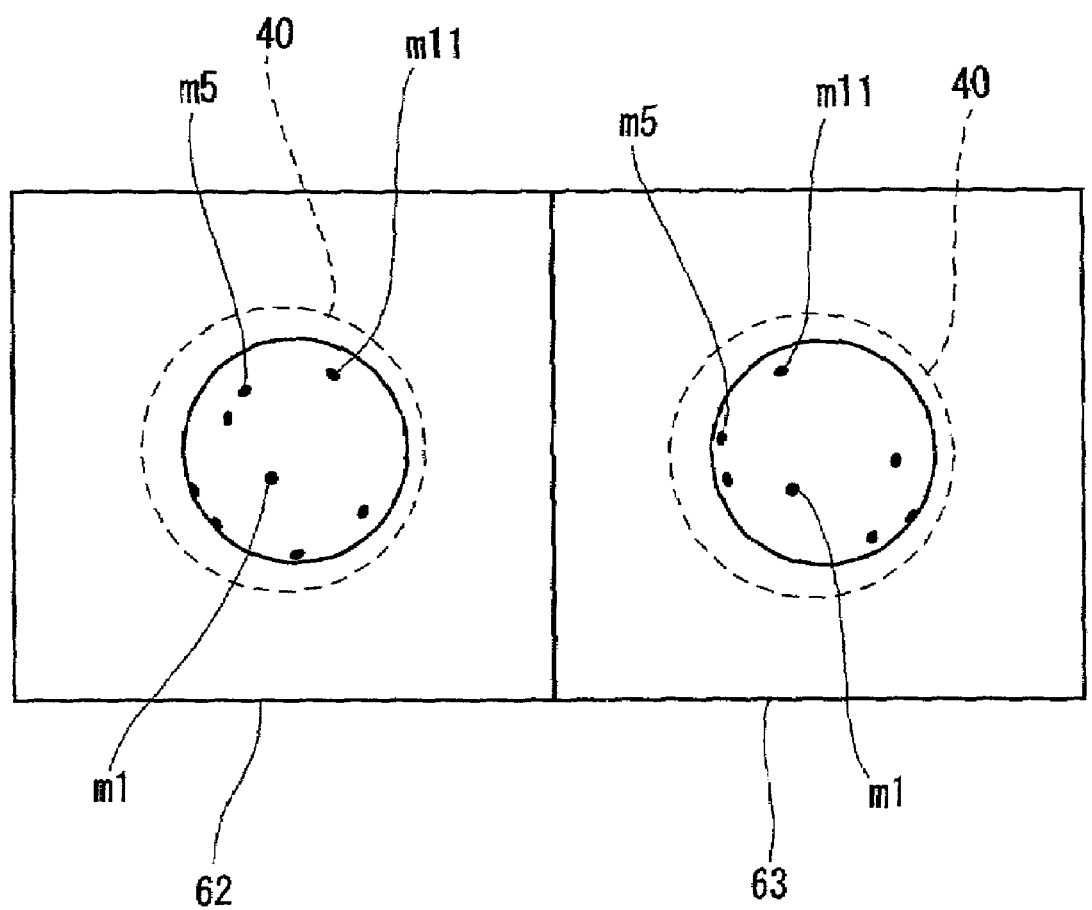
FIG. 13 shows an image of the golf ball which is photographed in a large size and unclear in its contour.

In the comparison example 2, from each of the ball images 62 and 63 shown in FIG. 13, similarly to the example 2, the rotational angle of the golf ball 40 and the inclination of its rotational axis were computed, similarly to the comparison example 1. Table 2 shows the results of the measurement.

COMPARISON EXAMPLE 3

Figure 14:
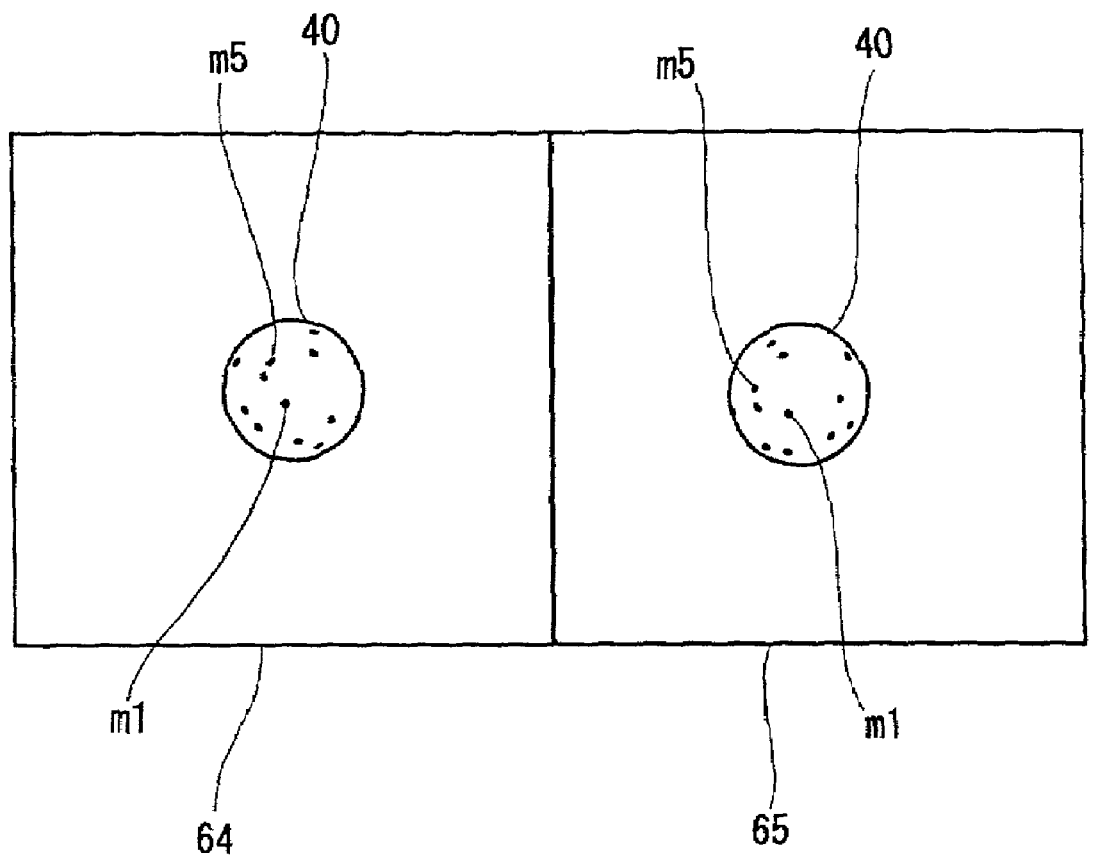
FIG. 14 shows an image of the golf ball which is photographed in a small size and clear in its contour.

In the comparison example 3, from each of the ball images 64 and 65 shown in FIG. 14, similarly to the example 3, the rotational angle of the golf ball 40 and the inclination of its rotational axis were computed, similarly to the comparison example 1. Table 2 shows the results of the measurement.

COMPARISON EXAMPLE 4

Figure 15:
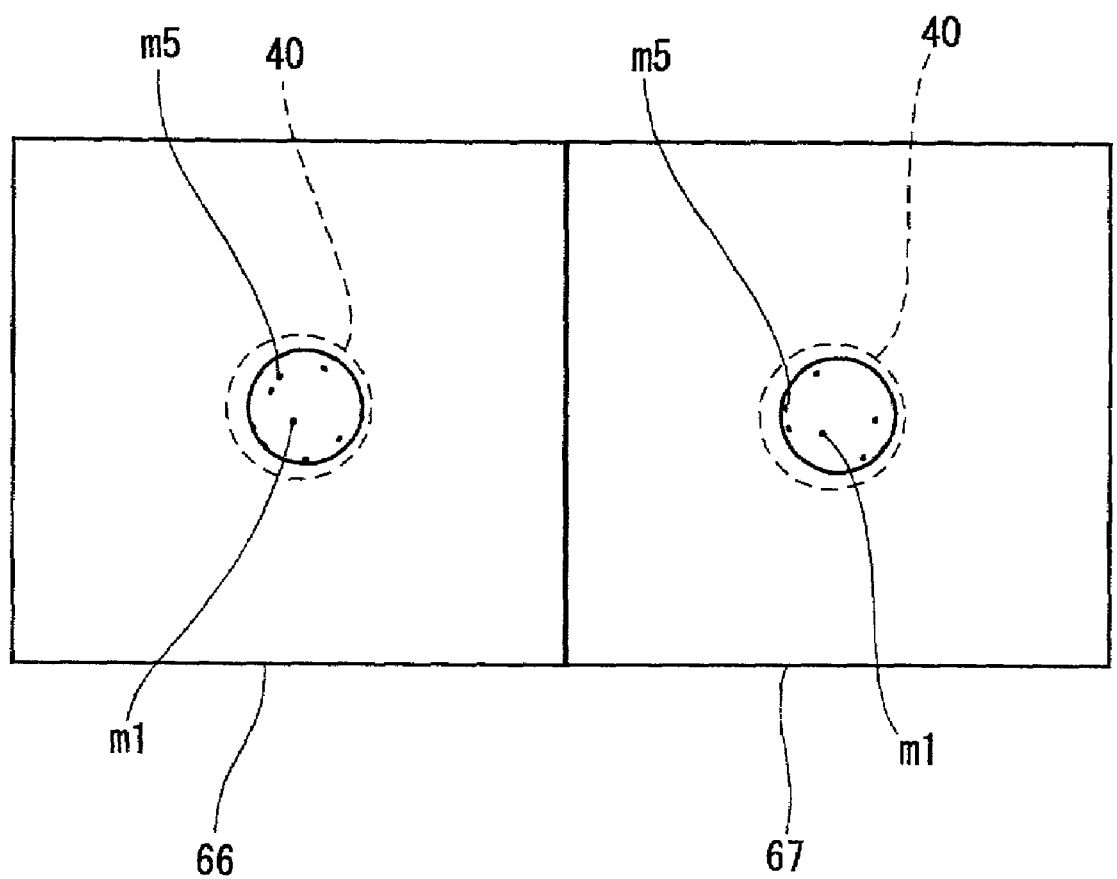
FIG. 15 shows an image of the golf ball which is photographed in a small size and unclear in its contour.

In the comparison example 4, from each of the ball images 66 and 67 shown in FIG. 15, similarly to the example 4 the rotational angle of the golf ball 40 and the inclination of its rotational axis were computed, similarly to the comparison example 1. Table 2 shows the results of the measurement.

TABLE 3

| Difference between set value and examples 1–4 and comparison examples 1–4 | Rotational angle (°) | Inclination of rotational axis (°) |
| --- | --- | --- |
| Example 1 | 0.2 | −0.1 |
| Example 2 | −0.2 | 0.1 |
| Example 3 | −0.3 | 0.3 |
| Example 4 | 0.5 | 0.4 |
| Comparison Example 1 | 0.4 | −0.5 |
| Comparison Example 2 | 0.7 | −0.8 |
| Comparison Example 3 | 1.6 | −1.9 |
| Comparison Example 4 | 3.1 | −1.8 |

Comparing the examples 1–4 and the comparison examples 1–4 with each other, based on the table 3 indicating the difference between the set value of the golf ball rotation/displacement apparatus 50 and the rotational angle of the golf ball as well as the inclination of its rotational axis, the examples 1–4 have smaller errors than the comparison examples 1–4. That is, a higher degree of measurement was made in the examples 1–4 than in the comparison examples 1–4. It was found that this tendency becomes increasingly outstanding as the photographing condition became worse.

That is, in the comparison between the example 1 and the comparison example 1 both favorable in the photographing condition, the error of the comparison example 1 was twice as large as that of the example 1 in the rotational angle and five times as large as that of the example 1 in the inclination of the rotational axis. That is, the example 1 had a smaller error than the comparison example 1 with respect to the set value. That is, measurement was made at a higher degree in the example 1 than in the comparison example 1. In the comparison between the example 2 and the comparison example 2 in which the ball image was large but the contour thereof was unclear, the absolute value of the error of the example 2 was almost equal to that of the example 1. On the other hand, the comparison example 2 was larger than the comparison example 1 in the absolute value of the rotational angle and the inclination of the rotational axis. Thus the difference between the degree of the error between the example 2 and the comparison example 2 was larger than the difference between the degree of the error between the example 1 and the comparison example 1.

In the comparison between the example 3 and the comparison example 3 in which the ball image was small but the contour thereof was clear, the error of the example 3 was a little larger than that of the example 2 in the absolute value of the rotational angle and the inclination of the rotational axis but almost equal to that of the example 1. On the other hand, the error of the comparison example 3 was much larger than that of the comparison example 2 and much lower than the example 3 in the measuring accuracy. In the comparison example 3, the inclination of the rotational axis was 1.9 degrees with respect to the set value. Thus it is very difficult to apply the conventional measuring method to the comparison example 3.

In the comparison between the example 4 and the comparison example 4 in which the photographing condition was worst, the error of the example 4 was a little larger than that of the example 1. More specifically, the difference between the absolute value of the set value and that of the error of the example 4 was 0.5 degree in the rotational angle and 0.4 degrees in the inclination of the rotational axis. But even in the worst photographing condition, the measuring accuracy of the example 4 was almost equal to that of the comparison example 1. On the other hand, the error of the comparison example 4 was much larger than the set value in the rotational angle. More specifically, the difference between the absolute value of the set value and that of the error of the comparison example 4 was as large as 3.1 degrees. Thus, it is very difficult to apply the conventional measuring method to the comparison example 4. In the comparison example 4, the error in the inclination of the rotational axis was as large as that of the comparison example 3. That is, even though the photographing condition changed, in the examples 1–4, the error on the measurement hardly changed, and the measurement was made with high reliability and accuracy. On the other hand, in the comparison examples 1–4, as the photographing condition became worse, the error on the measurement became increasingly large. In the above-described examples and comparison examples, the rotational amount was not computed but the rotational angle was computed. But by photographing two images at a predetermined interval during the displacement of the imaginary sphere, the rotational amount can be found from numerical values relating to the interval and the angle of the displacement of the imaginary sphere.

As apparent from the foregoing description, in the measuring method carried out by the apparatus of measuring the three-dimensional posture of the sphere, a computation is performed according to the program provided inside a computer, on the basis of the photographed image of the sphere. Thereby the rotational amount of the sphere and the inclination of its rotational shaft can be automatically measured. Therefore it is possible to reduce time and labor greatly.

In the case where a photographed sphere image is clear, the measuring method of the present invention is capable of making measurement with higher accuracy than the conventional method. In the case where a photographed sphere image is unclear, the measuring method of the present invention is capable of making measurement with much higher accuracy than the conventional measuring method, because data of the contour of the sphere is not used in the measuring method of the present invention. Accordingly the measuring method of the present invention prevents measured results from being influenced by a photographing situation, prevents an operator from taking much time and labor in a photographing operation of finely adjusting the manner of emitting flashlight to the sphere, allows measurement to be made with high accuracy, and reduces the cost required in the measurement.

Furthermore, the measuring method of the present invention allows the posture of the sphere to be specified by making measurement on the basis of one two-dimensional sphere image, thus reducing time and labor required to specify the posture the sphere.

In addition, the measuring method of the present invention is capable of specifying the posture of the sphere and measuring its rotational amount and the direction of its rotational axis by utilizing a high-speed shutter-provided camera and a micro-flash.

What is claimed is:

1. A method of measuring a three-dimensional posture of a sphere, comprising the steps of:
    photographing a sphere having a plurality of marks given to a surface thereof to obtain a two-dimensional image of said sphere;
    preparing an imaginary sphere having a plurality of marks given to a surface thereof in a three-dimensional coordinate space on a computer;

setting an arbitrary posture of said imaginary sphere as a reference posture and setting an arbitrary direction to view an imaginary sphere as a viewing direction;

said computer working to displace said posture of said imaginary sphere in such a way that said marks given to said imaginary sphere are coincident with said marks on said surface of said two-dimensional image of said sphere; and specifying a three-dimensional posture of said sphere on the basis of a displacement amount of said posture of said imaginary sphere relative to said reference posture.

2. The method of measuring a three-dimensional posture of a sphere according to claim 1, wherein said posture displacement operation is to magnify and minify, move, and rotate said imaginary sphere; and said displacement amount of said posture of said imaginary sphere relative to said reference posture is specified by a computation based on a Genetic Algorithms as an amount of said operation of magnifying and minifying, moving, and rotating said imaginary sphere.

3. The method of measuring a three-dimensional posture of a sphere according to claim 2, wherein in said computation based on said Genetic Algorithms, said magnifying and minifying amount is set as one variable relating to said operation of magnifying and minifying said imaginary sphere, said moving amount is set as two independent variables relating to said operation of moving said imaginary sphere two-dimensionally, and said rotating amount is set as three independent variables relating to said operation of rotating said imaginary sphere three-dimensionally; and each of said operations is performed on the basis of each of said six variables.

4. The method of measuring a three-dimensional posture of a sphere according to claim 3, wherein not less than two kinds nor more than 1000 kinds of individuals each consisting of a group of said six variables are formed, and said individuals are computed based on said Genetic Algorithms.

5. The method of measuring a three-dimensional posture of a sphere according to claim 4, wherein in a computation based on said Genetic Algorithms, a numerical value of each of said six variables is converted from a decimal number into not less a 5-bit binary number nor more than a 20-bit binary number by setting one digit of said binary number to one bit.

6. The method of measuring a three-dimensional posture of a sphere according to claim 5, wherein said computation based on said Genetic Algorithms comprises the steps of:

for each of said individuals, performing a first-time posture displacement operation corresponding to a first generation, based on a given numerical value of said six variables of each of said individuals;

calculating a fitness value from a function on a distance between each mark on a surface of said two-dimensional image of said sphere and each mark on a surface of said posture-displaced imaginary sphere for a posture displacement operation which is performed for each of said individuals;

performing a reproduction by setting a probability of individuals which can leave descendants to the next generation, according to a numerical value of said fitness value and by selecting individuals which can leave descendants to said next generation according to said probability;

repeating said posture displacement operation, computation of said fitness value, and said reproduction for each of said individuals;

terminating said computation when a maximum value of said found fitness value does not change in a range of not less than 100th generation nor more than 10000th generation; and specifying an amount of said posture displacement operation at the time when said computation has terminated as a three-dimensional posture of said sphere.

7. The method of measuring a three-dimensional posture of a sphere according to claim 4, wherein said computation based on said Genetic Algorithms comprises the steps of:

for each of said individuals, performing a first-time posture displacement operation corresponding to a first generation, based on a given numerical value of said six variables of each of said individuals;

calculating a fitness value from a function on a distance between each mark on a surface of said two-dimensional image of said sphere and each mark on a surface of said posture-displaced imaginary sphere for a posture displacement operation which is performed for each of said individuals;

performing a reproduction by setting a probability of individuals which can leave descendants to the next generation, according to a numerical value of said fitness value and by selecting individuals which can leave descendants to said next generation according to said probability;

repeating said posture displacement operation, computation of said fitness value, and said reproduction for each of said individuals;

terminating said computation when a maximum value of said found fitness value does not change in a range of not less than 100th generation nor more than 10000th generation; and specifying an amount of said posture displacement operation at the time when said computation has terminated as a three-dimensional posture of said sphere.

8. The method of measuring a three-dimensional posture of a sphere according to claim 3, wherein in a computation based on said Genetic Algorithms, a numerical value of each of said six variables is converted from a decimal number into not less a 5-bit binary number nor more than a 20-bit binary number by setting one digit of said binary number to one bit.

9. The method according to claim 1, wherein said marks are given to said surface of said sphere in such a way that all of said marks are coincident with each other, when said sphere is viewed in a certain direction, before and after said sphere is rotated on an axis passing through the center thereof at an angle obtained by dividing 360 degrees by a natural number of five or less.

10. The method according to claim 9, wherein said marks are given at random to said entire surface of said sphere.

11. The method according to claim 1, wherein not less than 10 nor more than 100 marks are given to said surface of said sphere entirely.

12. A method of measuring a rotational amount of a sphere and a direction of a rotational axis of said sphere, comprising the steps of:

specifying a three-dimensional posture of said sphere for each of a plurality of two-dimensional images of said sphere obtained by taking a plurality of photographs of said rotating sphere having a plurality of marks given to a surface thereof at predetermined time intervals, by using a method according to claim 1; and calculating said rotational amount of said sphere and said direction of said rotational axis thereof by specifying a matrix relating to a rotation operation of making said three-dimensional posture of said sphere in an earlier time zone coincident with said three-dimensional posture of said sphere in a later time zone in predetermined intervals.

13. An apparatus of measuring a three-dimensional posture of a sphere, comprising:
   a photographing means capable of photographing said sphere in various directions;
   a recording means for recording a two-dimensional image of said sphere obtained by said photographing means; and
   a computing means for preparing an imaginary sphere similar to said sphere in a three-dimensional coordinate space; and computing a posture of said sphere, a rotational amount thereof, and a direction of a rotational axis thereof, based on said imaginary sphere and said two-dimensional image of said sphere,
   wherein said computing means has a posture recognition program for displacing a posture of said imaginary sphere in such a way that a certain mark on a surface of said two-dimensional image of said sphere is coincident with a certain mark on said surface of said imaginary sphere and specifying a three-dimensional posture of said sphere on the basis of a displacement amount of said posture of said imaginary sphere relative to a reference posture of said imaginary sphere.

14. The apparatus of measuring a three-dimensional posture of a sphere according to claim 13, wherein said computing means has a computing program computing a displacement amount of said posture of said imaginary sphere relative to said reference posture thereof, based on a Genetic Algorithms.

15. The apparatus of measuring a three-dimensional posture of a sphere according to claim 13, wherein said photographing means is constructed so as to photograph said rotating sphere at a plurality of times at predetermined intervals.

* * * * *